(12) United States Patent
Chen et al.

(10) Patent No.: US 12,323,615 B2
(45) Date of Patent: Jun. 3, 2025

(54) FULL-PIXEL BASED AND GROUP-BASED MOTION COMPENSATED PICTURE BOUNDARY PADDING

(71) Applicant: Tencent America LLC, Palo Alto, CA (US)

(72) Inventors: Lien-Fei Chen, Hsinchu (TW); Xiaozhong Xu, State College, PA (US); Guichun Li, San Jose, CA (US); Xin Zhao, Santa Clara, CA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 33 days.

(21) Appl. No.: 18/207,541

(22) Filed: Jun. 8, 2023

(65) Prior Publication Data

US 2024/0022758 A1   Jan. 18, 2024

Related U.S. Application Data

(60) Provisional application No. 63/388,598, filed on Jul. 12, 2022.

(51) Int. Cl.
*H04N 19/52* (2014.01)
*H04N 19/139* (2014.01)
(Continued)

(52) U.S. Cl.
CPC ........... *H04N 19/52* (2014.11); *H04N 19/139* (2014.11); *H04N 19/14* (2014.11); *H04N 19/172* (2014.11); *H04N 19/176* (2014.11); *H04N 19/80* (2014.11)

(58) Field of Classification Search
None
See application file for complete search history.

(56) References Cited

U.S. PATENT DOCUMENTS

| | | | |
|---|---|---|---|
| 2021/0368203 A1* | 11/2021 | Zhang | H04N 19/132 |
| 2023/0328257 A1* | 10/2023 | Zhang | H04N 19/159 |
| | | | 375/240.15 |

OTHER PUBLICATIONS

ITU-T Study Group. "High efficiency video coding, Series H: Audiovisual and multimedia systems: Infrastructure of audiovisual services—coding of moving video." in General Secretariat and Telecom Radiocommunication (ITU-R) Standardization (ITU-T), sec. H 265, Dec. 2016, pp. 1-664.

(Continued)

*Primary Examiner* — Samuel D Fereja
(74) *Attorney, Agent, or Firm* — ArentFox Schiff LLP

(57) ABSTRACT

Aspects of the disclose provide methods and an apparatus for video and/or image coding. The apparatus includes processing circuitry that receives a bitstream including a plurality of pictures. The processing circuitry determines an initial motion vector (MV) associated with a motion compensation padding (MCP) block according to motion information of a boundary block located at a picture boundary of a picture in the plurality of pictures. The boundary block is located in the picture. The MCP block is located in an MCP area outside of the picture and adjacent to the picture boundary. The initial MV has a fractional precision. The processing circuitry generates a final MV associated with the MCP block based on the initial MV. The final MV has an integer precision. The processing circuitry reconstructs, according to the generated final MV having the integer precision, at least a sample in the MCP block.

18 Claims, 11 Drawing Sheets

(51) Int. Cl.
*H04N 19/14* (2014.01)
*H04N 19/172* (2014.01)
*H04N 19/176* (2014.01)
*H04N 19/80* (2014.01)

(56) References Cited

OTHER PUBLICATIONS

ITU-T Study Group. "Versatile video coding, Series H: Audiovisual and multimedia systems: Infrastructure of audiovisual services—coding of moving video." in General Secretariat and Telecom Radiocommunication (ITU-R) Standardization (ITU-T), sec. H 266, Aug. 2020, pp. 1-516.

M. Coban, et al., "Algorithm description of Enhanced Compression Model 5 (ECM5)", ISO/IEC JTC1/SC29/WG5 JVET-Z2025, Apr. 2022, pp. 1-45.

Y. Chen, et al., "Description of SDR, HDR and 360° video coding technology proposal by Qualcomm and Technicolor—low and high complexity versions", ISO/IEC JTC1/SC29/WG11 JVET-J0021, Apr. 2018, pp. 1-43.

Z. Zhang, H. Huang, C.-C. Chen, Y.-J. Chang, Y. hang, V. Seregin, M. Coban, and M. Karczewicz, "EE2-related: Motion compensation boundary padding," ISO/IEC JTC1/SC29/WG5 JVET-Z0130, Apr. 2022, pp. 1-5.

F. L. Léannec, et al., "EE2-2.2: Motion compensated picture boundary padding", ISO/IEC JTC1/SC29/WG5 JVET-AA0096, Jul. 2022, pp. 1-5.

\* cited by examiner

FULL-PIXEL BASED AND GROUP-BASED MOTION COMPENSATED PICTURE BOUNDARY PADDING

INCORPORATION BY REFERENCE

The present application claims the benefit of priority to U.S. Provisional Application No. 63/388,598, "Picture Boundary Fractional Motion Compensation Free Padding and Grouping Based MC Padding" filed on Jul. 12, 2022, which is incorporated by reference herein in its entirety.

TECHNICAL FIELD

The present disclosure describes embodiments generally related to video coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Image/video compression can help transmit image/video files across different devices, storage and networks with minimal quality degradation. In some examples, video codec technology can compress video based on spatial and temporal redundancy. In an example, a video codec can use techniques referred to as intra prediction that can compress image based on spatial redundancy. For example, the intra prediction can use reference data from the current picture under reconstruction for sample prediction. In another example, a video codec can use techniques referred to as inter prediction that can compress image based on temporal redundancy. For example, the inter prediction can predict samples in a current picture from previously reconstructed picture with motion compensation. The motion compensation is generally indicated by a motion vector (MV).

SUMMARY

Aspects of the disclosure provide methods and an apparatus for video and/or picture encoding/decoding. The apparatus for video decoding includes processing circuitry that receives a bitstream including a plurality of pictures. An initial motion vector (MV) associated with a motion compensation padding (MCP) block is determined according to motion information of a boundary block located at a picture boundary of a picture in the plurality of pictures. The boundary block is located in the picture. The MCP block is located in an MCP area outside of the picture and adjacent to the picture boundary. The initial MV has a fractional precision. A final MV associated with the MCP block has an integer precision is generated based on the initial MV. At least a sample in the MCP block is reconstructed according to the generated final MV.

In an embodiment, an MV associated with an MCP block is determined according to multiple pieces of motion information of respective multiple boundary blocks located at the picture boundary of the picture in the plurality of pictures. The multiple boundary blocks are located in the picture, and the MCP block is located in the MCP area outside of the picture and adjacent to the picture boundary. Each of the multiple boundary blocks is a spatial neighbor of a boundary block in the multiple boundary blocks. The multiple boundary blocks neighbor the MCP block. At least a sample in the MCP block is determined based on the determined MV.

In an embodiment, an MV associated with an MCP block is determined according to motion information of a boundary block located at the picture boundary of the picture. The boundary block is located in the picture. The MCP block is located in the MCP area outside of the picture and adjacent to the picture boundary of the picture. Samples in the MCP block are determined using motion compensation padding according to the determined MV. A sample in the MCP block is filtered based on at least one sample within the picture that is within N1 lines of the picture boundary of the picture.

Aspects of the disclosure also provide a non-transitory computer-readable medium storing instructions which when executed by a computer for video encoding/decoding cause the computer to perform the method for video encoding/decoding.

BRIEF DESCRIPTION OF THE DRAWINGS

Further features, the nature, and various advantages of the disclosed subject matter will be more apparent from the following detailed description and the accompanying drawings in which.

DETAILED DESCRIPTION OF EMBODIMENTS

Figure 1:
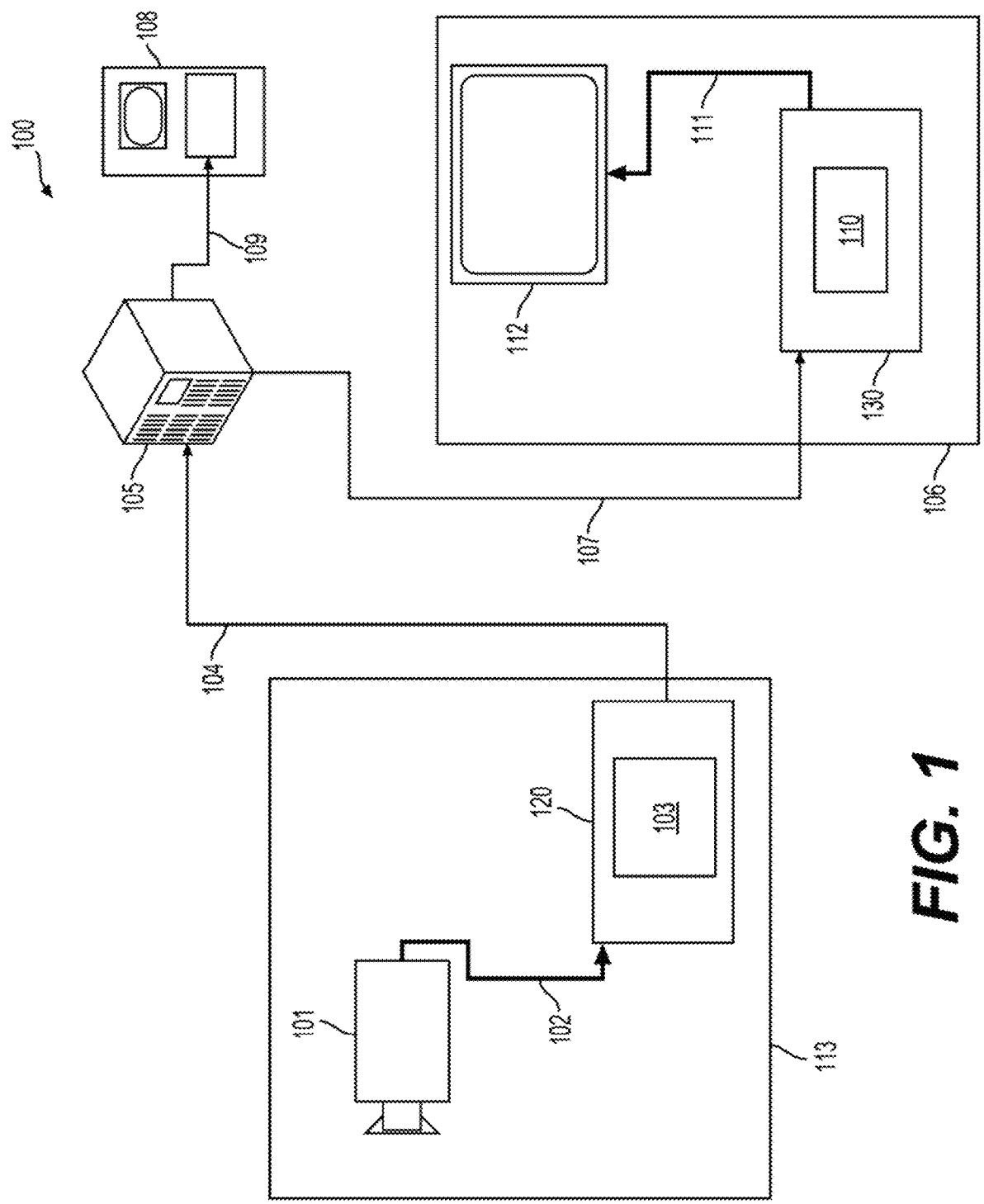
FIG. 1 is a schematic illustration of an exemplary block diagram of a communication system (100).

FIG. 1 shows a block diagram of a video processing system (100) in some examples. The video processing system (100) is an example of an application for the disclosed subject matter, a video encoder and a video decoder in a streaming environment. The disclosed subject matter can be equally applicable to other video enabled applications, including, for example, video conferencing, digital TV, streaming services, storing of compressed video on digital media including CD, DVD, memory stick and the like, and so on.

The video processing system (100) includes a capture subsystem (113), that can include a video source (101), for example a digital camera, creating for example a stream of video pictures (102) that are uncompressed. In an example, the stream of video pictures (102) includes samples that are taken by the digital camera. The stream of video pictures (102), depicted as a bold line to emphasize a high data volume when compared to encoded video data (104) (or coded video bitstreams), can be processed by an electronic device (120) that includes a video encoder (103) coupled to the video source (101). The video encoder (103) can include hardware, software, or a combination thereof to enable or implement aspects of the disclosed subject matter as described in more detail below. The encoded video data (104) (or encoded video bitstream), depicted as a thin line to emphasize the lower data volume when compared to the stream of video pictures (102), can be stored on a streaming server (105) for future use. One or more streaming client subsystems, such as client subsystems (106) and (108) in FIG. 1 can access the streaming server (105) to retrieve copies (107) and (109) of the encoded video data (104). A client subsystem (106) can include a video decoder (110), for example, in an electronic device (130). The video decoder (110) decodes the incoming copy (107) of the encoded video data and creates an outgoing stream of video pictures (111) that can be rendered on a display (112) (e.g., display screen) or other rendering device (not depicted). In some streaming systems, the encoded video data (104), (107), and (109) (e.g., video bitstreams) can be encoded according to certain video coding/compression standards. Examples of those standards include ITU-T Recommendation H.265. In an example, a video coding standard under development is informally known as Versatile Video Coding (VVC). The disclosed subject matter may be used in the context of VVC.

It is noted that the electronic devices (120) and (130) can include other components (not shown). For example, the electronic device (120) can include a video decoder (not shown) and the electronic device (130) can include a video encoder (not shown) as well.

Figure 2:
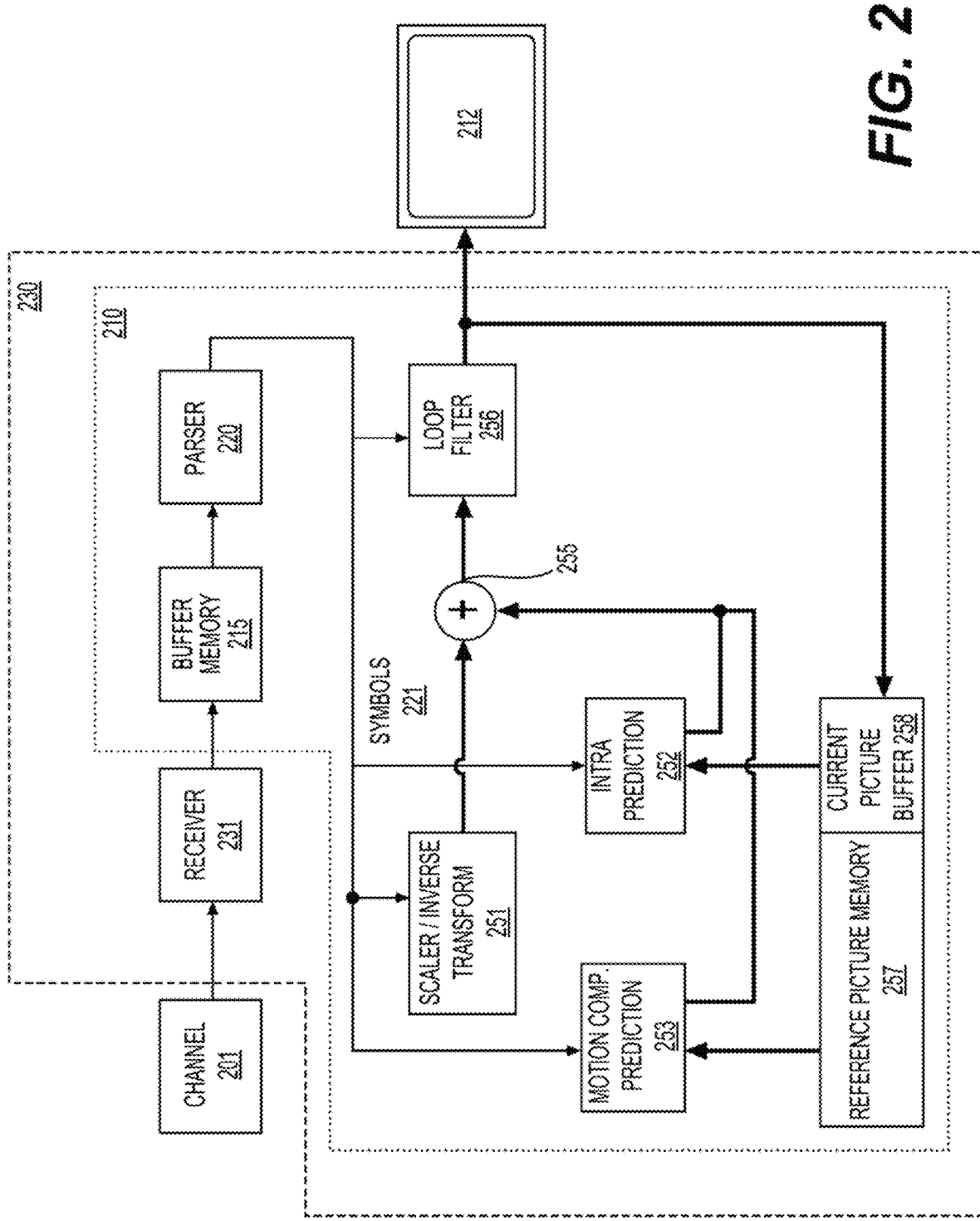
FIG. 2 is a schematic illustration of an exemplary block diagram of a decoder.

FIG. 2 shows an exemplary block diagram of a video decoder (210). The video decoder (210) can be included in an electronic device (230). The electronic device (230) can include a receiver (231) (e.g., receiving circuitry). The video decoder (210) can be used in the place of the video decoder (110) in the FIG. 1 example.

The receiver (231) may receive one or more coded video sequences to be decoded by the video decoder (210). In an embodiment, one coded video sequence is received at a time, where the decoding of each coded video sequence is independent from the decoding of other coded video sequences. The coded video sequence may be received from a channel (201), which may be a hardware/software link to a storage device which stores the encoded video data. The receiver (231) may receive the encoded video data with other data, for example, coded audio data and/or ancillary data streams, that may be forwarded to their respective using entities (not depicted). The receiver (231) may separate the coded video sequence from the other data. To combat network jitter, a buffer memory (215) may be coupled in between the receiver (231) and an entropy decoder/parser (220) ("parser (220)" henceforth). In certain applications, the buffer memory (215) is part of the video decoder (210). In others, it can be outside of the video decoder (210) (not depicted). In still others, there can be a buffer memory (not depicted) outside of the video decoder (210), for example to combat network jitter, and in addition another buffer memory (215) inside the video decoder (210), for example to handle playout timing. When the receiver (231) is receiving data from a store/forward device of sufficient bandwidth and controllability, or from an isosynchronous network, the buffer memory (215) may not be needed, or can be small. For use on best effort packet networks such as the Internet, the buffer memory (215) may be required, can be comparatively large and can be advantageously of adaptive size, and may at least partially be implemented in an operating system or similar elements (not depicted) outside of the video decoder (210).

The video decoder (210) may include the parser (220) to reconstruct symbols (221) from the coded video sequence. Categories of those symbols include information used to manage operation of the video decoder (210), and potentially information to control a rendering device such as a render device (212) (e.g., a display screen) that is not an integral part of the electronic device (230) but can be coupled to the electronic device (230), as shown in FIG. 2. The control information for the rendering device(s) may be in the form of Supplemental Enhancement Information (SEI) messages or Video Usability Information (VUI) parameter set fragments (not depicted). The parser (220) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (220) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (220) may also extract from the coded video sequence information such as transform coefficients, quantizer parameter values, motion vectors, and so forth.

The parser (220) may perform an entropy decoding/parsing operation on the video sequence received from the buffer memory (215), so as to create symbols (221).

Reconstruction of the symbols (221) can involve multiple different units depending on the type of the coded video picture or parts thereof (such as: inter and intra picture, inter and intra block), and other factors. Which units are involved, and how, can be controlled by subgroup control information parsed from the coded video sequence by the parser (220). The flow of such subgroup control information between the parser (220) and the multiple units below is not depicted for clarity.

Beyond the functional blocks already mentioned, the video decoder (210) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (251). The scaler/inverse transform unit (251) receives a quantized transform coefficient as well as control information, including which transform to use, block size, quantization factor, quantization scaling matrices, etc. as symbol(s) (221) from the parser (220). The scaler/inverse transform unit (251) can output blocks comprising sample values, that can be input into aggregator (255).

In some cases, the output samples of the scaler/inverse transform unit (251) can pertain to an intra coded block. The intra coded block is a block that is not using predictive information from previously reconstructed pictures, but can use predictive information from previously reconstructed parts of the current picture. Such predictive information can be provided by an intra picture prediction unit (252). In some cases, the intra picture prediction unit (252) generates a block of the same size and shape of the block under reconstruction, using surrounding already reconstructed information fetched from the current picture buffer (258). The current picture buffer (258) buffers, for example, partly reconstructed current picture and/or fully reconstructed current picture. The aggregator (255), in some cases, adds, on a per sample basis, the prediction information the intra prediction unit (252) has generated to the output sample information as provided by the scaler/inverse transform unit (251).

In other cases, the output samples of the scaler/inverse transform unit (251) can pertain to an inter coded, and potentially motion compensated, block. In such a case, a motion compensation prediction unit (253) can access reference picture memory (257) to fetch samples used for prediction. After motion compensating the fetched samples in accordance with the symbols (221) pertaining to the block, these samples can be added by the aggregator (255) to the output of the scaler/inverse transform unit (251) (in this case called the residual samples or residual signal) so as to generate output sample information. The addresses within the reference picture memory (257) from where the motion compensation prediction unit (253) fetches prediction samples can be controlled by motion vectors, available to the motion compensation prediction unit (253) in the form of symbols (221) that can have, for example X, Y, and reference picture components. Motion compensation also can include interpolation of sample values as fetched from the reference picture memory (257) when sub-sample exact motion vectors are in use, motion vector prediction mechanisms, and so forth.

The output samples of the aggregator (255) can be subject to various loop filtering techniques in the loop filter unit (256). Video compression technologies can include in-loop filter technologies that are controlled by parameters included in the coded video sequence (also referred to as coded video bitstream) and made available to the loop filter unit (256) as symbols (221) from the parser (220). Video compression can also be responsive to meta-information obtained during the decoding of previous (in decoding order) parts of the coded picture or coded video sequence, as well as responsive to previously reconstructed and loop-filtered sample values.

The output of the loop filter unit (256) can be a sample stream that can be output to the render device (212) as well as stored in the reference picture memory (257) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (220)), the current picture buffer (258) can become a part of the reference picture memory (257), and a fresh current picture buffer can be reallocated before commencing the reconstruction of the following coded picture.

The video decoder (210) may perform decoding operations according to a predetermined video compression technology or a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (231) may receive additional (redundant) data with the encoded video. The additional data may be included as part of the coded video sequence(s). The additional data may be used by the video decoder (210) to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 3:
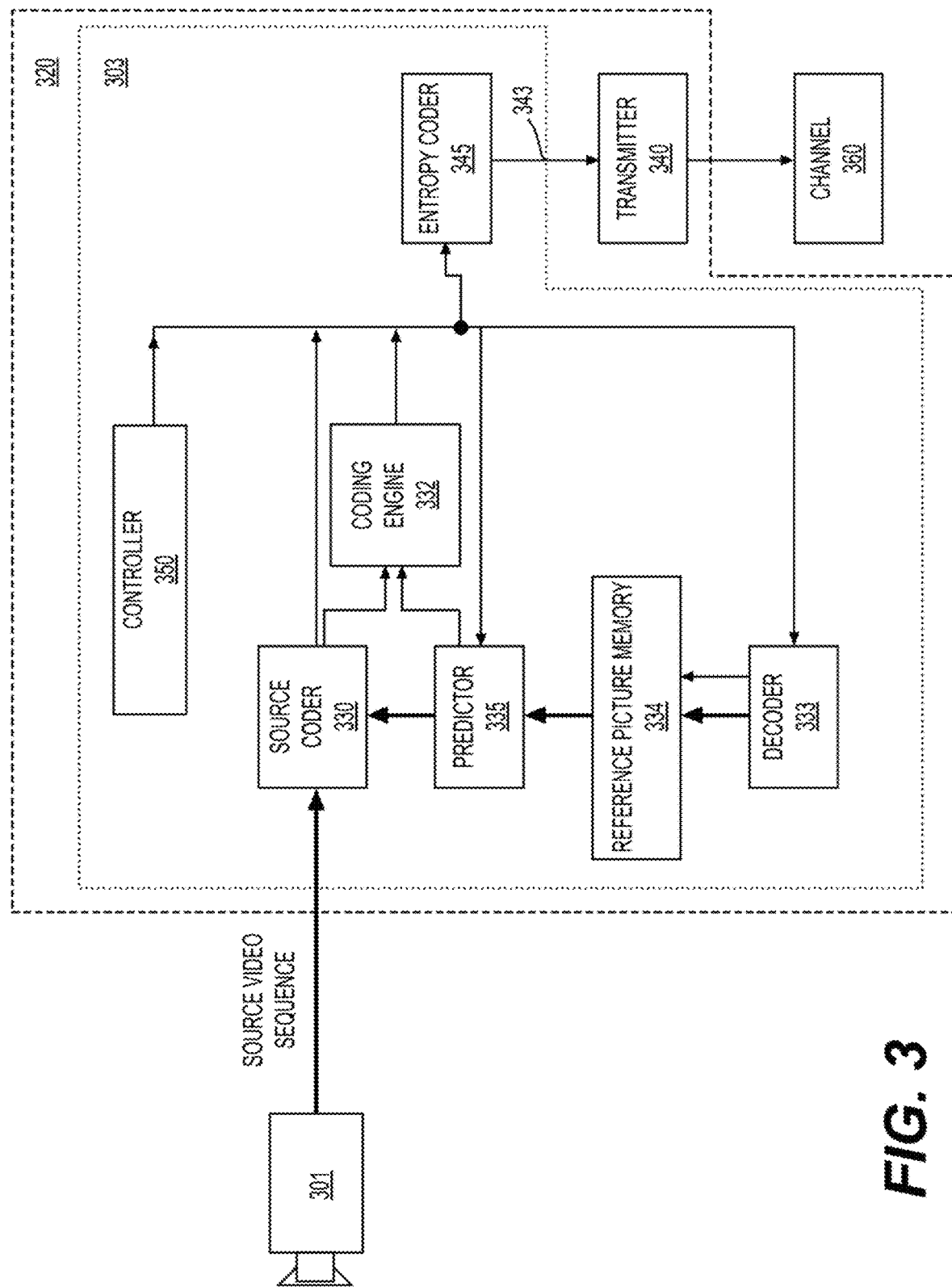
FIG. 3 is a schematic illustration of an exemplary block diagram of an encoder.

FIG. 3 shows an exemplary block diagram of a video encoder (303). The video encoder (303) is included in an electronic device (320). The electronic device (320) includes a transmitter (340) (e.g., transmitting circuitry). The video encoder (303) can be used in the place of the video encoder (103) in the FIG. 1 example.

The video encoder (303) may receive video samples from a video source (301) (that is not part of the electronic device (320) in the FIG. 3 example) that may capture video image(s) to be coded by the video encoder (303). In another example, the video source (301) is a part of the electronic device (320).

The video source (301) may provide the source video sequence to be coded by the video encoder (303) in the form of a digital video sample stream that can be of any suitable bit depth (for example: 8 bit, 10 bit, 12 bit, . . . ), any colorspace (for example, BT.601 Y CrCB, RGB, . . . ), and any suitable sampling structure (for example Y CrCb 4:2:0, Y CrCb 4:4:4). In a media serving system, the video source (301) may be a storage device storing previously prepared video. In a videoconferencing system, the video source (301) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focuses on samples.

According to an embodiment, the video encoder (303) may code and compress the pictures of the source video sequence into a coded video sequence (343) in real time or under any other time constraints as required. Enforcing appropriate coding speed is one function of a controller (350). In some embodiments, the controller (350) controls other functional units as described below and is functionally coupled to the other functional units. The coupling is not depicted for clarity. Parameters set by the controller (350) can include rate control related parameters (picture skip, quantizer, lambda value of rate-distortion optimization techniques, . . . ), picture size, group of pictures (GOP) layout, maximum motion vector search range, and so forth. The controller (350) can be configured to have other suitable functions that pertain to the video encoder (303) optimized for a certain system design.

In some embodiments, the video encoder (303) is configured to operate in a coding loop. As an oversimplified description, in an example, the coding loop can include a source coder (330) (e.g., responsible for creating symbols, such as a symbol stream, based on an input picture to be coded, and a reference picture(s)), and a (local) decoder (333) embedded in the video encoder (303). The decoder (333) reconstructs the symbols to create the sample data in a similar manner as a (remote) decoder also would create. The reconstructed sample stream (sample data) is input to the reference picture memory (334). As the decoding of a symbol stream leads to bit-exact results independent of decoder location (local or remote), the content in the reference picture memory (334) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (333) can be the same as of a "remote" decoder, such as the video decoder (210), which has already been described in detail above in conjunction with FIG. 2. Briefly referring also to FIG. 2, however, as symbols are available and encoding/decoding of symbols to a coded video sequence by an entropy coder (345) and the parser (220) can be lossless, the entropy decoding parts of the video decoder (210), including the buffer memory (215), and parser (220) may not be fully implemented in the local decoder (333).

In an embodiment, a decoder technology except the parsing/entropy decoding that is present in a decoder is present, in an identical or a substantially identical functional form, in a corresponding encoder. Accordingly, the disclosed subject matter focuses on decoder operation. The description of encoder technologies can be abbreviated as they are the inverse of the comprehensively described decoder technologies. In certain areas a more detail description is provided below.

During operation, in some examples, the source coder (330) may perform motion compensated predictive coding, which codes an input picture predictively with reference to one or more previously coded picture from the video sequence that were designated as "reference pictures." In this manner, the coding engine (332) codes differences between pixel blocks of an input picture and pixel blocks of reference picture(s) that may be selected as prediction reference(s) to the input picture.

The local video decoder (333) may decode coded video data of pictures that may be designated as reference pictures, based on symbols created by the source coder (330). Operations of the coding engine (332) may advantageously be lossy processes. When the coded video data may be decoded at a video decoder (not shown in FIG. 3), the reconstructed video sequence typically may be a replica of the source video sequence with some errors. The local video decoder (333) replicates decoding processes that may be performed by the video decoder on reference pictures and may cause reconstructed reference pictures to be stored in the reference picture memory (334). In this manner, the video encoder (303) may store copies of reconstructed reference pictures locally that have common content as the reconstructed reference pictures that will be obtained by a far-end video decoder (absent transmission errors).

The predictor (335) may perform prediction searches for the coding engine (332). That is, for a new picture to be coded, the predictor (335) may search the reference picture memory (334) for sample data (as candidate reference pixel blocks) or certain metadata such as reference picture motion vectors, block shapes, and so on, that may serve as an appropriate prediction reference for the new pictures. The predictor (335) may operate on a sample block-by-pixel block basis to find appropriate prediction references. In some cases, as determined by search results obtained by the predictor (335), an input picture may have prediction references drawn from multiple reference pictures stored in the reference picture memory (334).

The controller (350) may manage coding operations of the source coder (330), including, for example, setting of parameters and subgroup parameters used for encoding the video data.

Output of all aforementioned functional units may be subjected to entropy coding in the entropy coder (345). The entropy coder (345) translates the symbols as generated by the various functional units into a coded video sequence, by applying lossless compression to the symbols according to technologies such as Huffman coding, variable length coding, arithmetic coding, and so forth.

The transmitter (340) may buffer the coded video sequence(s) as created by the entropy coder (345) to prepare for transmission via a communication channel (360), which may be a hardware/software link to a storage device which would store the encoded video data. The transmitter (340) may merge coded video data from the video encoder (303) with other data to be transmitted, for example, coded audio data and/or ancillary data streams (sources not shown).

The controller (350) may manage operation of the video encoder (303). During coding, the controller (350) may assign to each coded picture a certain coded picture type, which may affect the coding techniques that may be applied to the respective picture. For example, pictures often may be assigned as one of the following picture types:

An Intra Picture (I picture) may be one that may be coded and decoded without using any other picture in the sequence as a source of prediction. Some video codecs allow for different types of intra pictures, including, for example Independent Decoder Refresh ("IDR") Pictures. A person skilled in the art is aware of those variants of I pictures and their respective applications and features.

A predictive picture (P picture) may be one that may be coded and decoded using intra prediction or inter prediction using at most one motion vector and reference index to predict the sample values of each block.

A bi-directionally predictive picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (303) may perform coding operations according to a predetermined video coding technology or standard, such as ITU-T Rec. H.265. In its operation, the video encoder (303) may perform various compression operations, including predictive coding operations that exploit temporal and spatial redundancies in the input video sequence. The coded video data, therefore, may conform to a syntax specified by the video coding technology or standard being used.

In an embodiment, the transmitter (340) may transmit additional data with the encoded video. The source coder (330) may include such data as part of the coded video sequence. Additional data may comprise temporal/spatial/SNR enhancement layers, other forms of redundant data such as redundant pictures and slices, SEI messages, VUI parameter set fragments, and so on.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some embodiments, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some embodiments of the disclosure, predictions, such as inter-picture predictions and intra-picture predictions, are performed in the unit of blocks. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability.

Generally, each PU includes a luma prediction block (PB), and two chroma PBs. In an embodiment, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels, and the like.

It is noted that the video encoders (103) and (303), and the video decoders (110) and (210) can be implemented using any suitable technique. In an embodiment, the video encoders (103) and (303) and the video decoders (110) and (210) can be implemented using one or more integrated circuits. In another embodiment, the video encoders (103) and (303), and the video decoders (110) and (210) can be implemented using one or more processors that execute software instructions.

Aspects of the disclosure provide techniques for motion compensated picture boundary padding (also referred to as motion compensation boundary padding or motion compensation padding (MCP)). The techniques for motion compensated picture boundary padding can include using full-pixel (or full-sample) motion compensation data for a padding operation at a picture boundary of a picture. By using the full-pixel motion compensation, a direct memory access (DMA) (e.g., a simple DMA) can be utilized to fetch the full-pixel data from a corresponding reference picture as padded pixel data in an MCP area at the picture boundary without any fractional interpolation operation. The MCP area is outside the picture. A motion vector (MV) grouping method can also be used to enhance an access efficiency of a memory bus.

Various inter prediction modes can be used in VVC. For an inter-predicted CU, motion parameters can include motion vector(s), one or more reference picture indices, a reference picture list usage index, and additional information for certain coding features to be used for inter-predicted sample generation. A motion parameter can be signaled explicitly or implicitly. When a CU is coded with a skip mode, the CU can be associated with a PU and can have no significant residual coefficients, no coded motion vector delta or MV difference (e.g., MVD) or a reference picture index. A merge mode can be specified where the motion parameters for the current CU are obtained from neighboring CU(s), including spatial and/or temporal candidates, and optionally additional information such as introduced in VVC. The merge mode can be applied to an inter-predicted CU, not only for skip mode. In an example, an alternative to the merge mode is the explicit transmission of motion parameters, where motion information including, for example, MV(s), a corresponding reference picture index for each reference picture list, a reference picture list usage flag, and other information are signaled explicitly per CU.

In an embodiment, such as in VVC, VVC Test model (VTM) reference software includes one or more refined inter prediction coding tools that include: an extended merge prediction, a merge motion vector difference (MMVD) mode, an adaptive motion vector prediction (AMVP) mode with symmetric MVD signaling, an affine motion compensated prediction, a subblock-based temporal motion vector prediction (SbTMVP), an adaptive motion vector resolution (AMVR), a motion field storage (1/16th luma sample MV storage and 8×8 motion field compression), a bi-prediction with CU-level weights (BCW), a bi-directional optical flow (BDOF), a prediction refinement using optical flow (PROF), a decoder side motion vector refinement (DMVR), a combined inter and intra prediction (CIIP), a geometric partitioning mode (GPM), and the like.

Examples of inter predictions and related methods (e.g., refined inter prediction coding tools) are described below. To use the TMVP in a merge mode and/or an AMVP mode, in some examples, such as in VVC, storing the motion data in a collocated reference frame (or a collocated reference picture) is performed. In an example, the motion data is stored on an 8×8 block basis. To limit the storage of MVs used for the temporal prediction, a 10-bit mantissa-exponent representation method can be used to compress the stored MVs, for example, in VVC. In some embodiments, such as in ECMS, a granularity of motion storage is reduced to a 4×4 block basis.

Techniques for picture boundary padding can be used. The padded portion outside the picture boundary may be used to predict other pictures. For example, in VVC and ECM-4.0, an extended picture area (also referred to as an extended area) is an area surrounding the picture with a size of (maxCUwidth+16) in each direction of the picture boundary. Pixels (also referred to as repetitive padded pixels) in the extended picture area can be derived by repetitive boundary padding. When a reference block is located partially or completely out of the picture boundary (OOB), the repetitive padded pixels in the extended area can be used similarly as pixels in the reference picture for motion compensation.

Figures 4A, 4B:
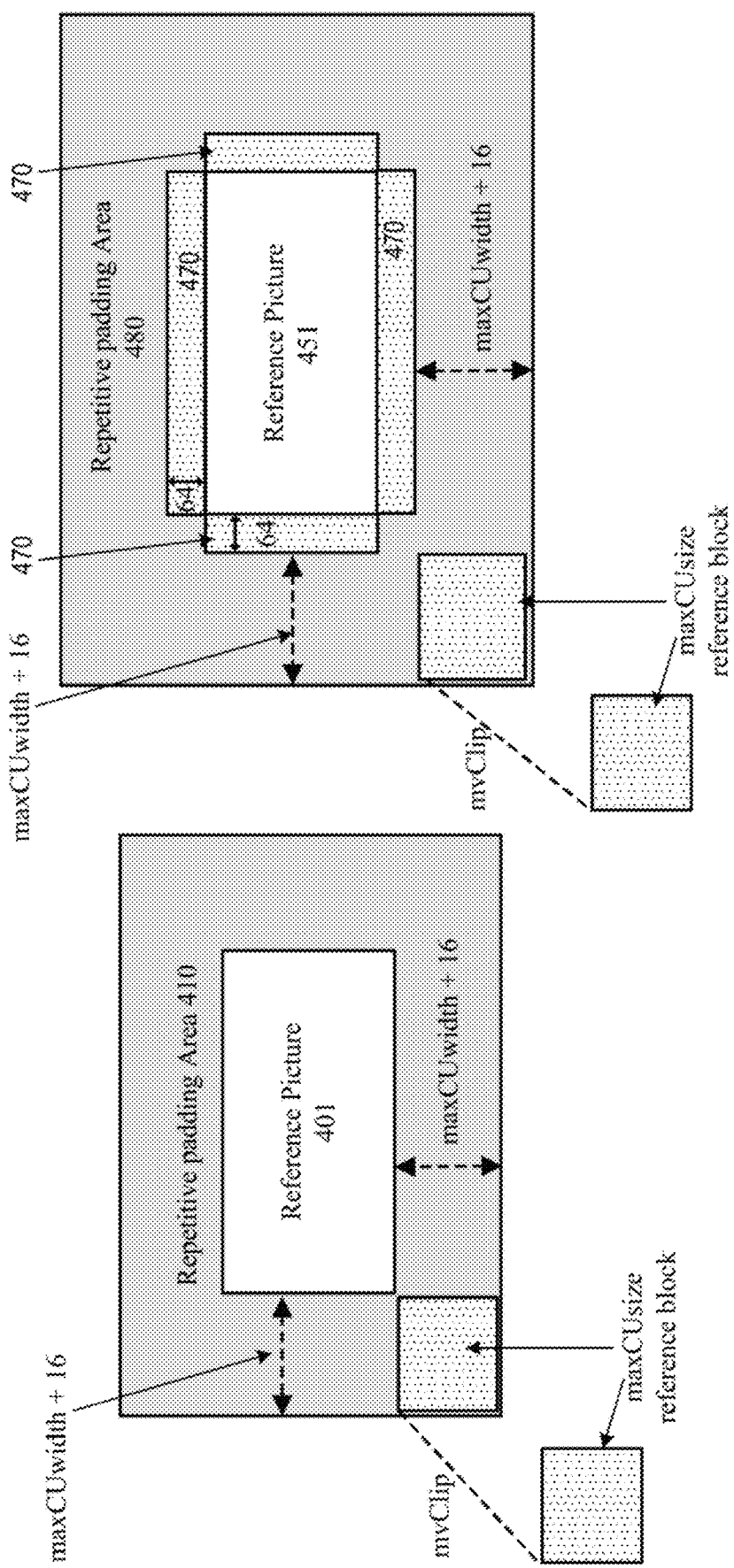
FIGS. 4A-4B show examples of reference pictures with extended areas.

FIG. 4A shows an example of a reference picture (401) with an extended area (also referred to as repetitive padding area or padded area) (410) that is padded according to the repetitive boundary padding in some examples (e.g., ECM-4.0). In an example, in a first round of the repetitive boundary padding, first pixels in the extended area that are immediate neighbors of pixels within a picture boundary of the reference picture (401) are padded based on the pixels within the picture boundary of the reference picture (401); in a second round of the repetitive boundary padding, second pixels in the extended area that are immediate neighbors of the first pixels are padded based on the first pixels; and the repetitive boundary padding can continue until all pixels in the extended area are padded.

In a related example, a technique for motion compensation boundary padding can be used. For example, samples outside of the picture boundary are derived by motion compensation instead of using only repetitive padding. FIG. 4B shows an example illustrating a reference picture with an extended area (also referred to as padded area) that is padded according to motion compensation boundary padding and the repetitive boundary padding. In the FIG. 4B example, a total padded area size can be increased by a pre-defined value L (e.g., 64) comparing to the padded area (410) in FIG. 4A. The extended area in FIG. 4B can include a first portion (470) that can be padded according to the motion compensation boundary padding. The first portion (470) can also be referred to as a motion compensation (MC) padding area (or an MCP area). The extended area in FIG. 4B can include a repetitive padding area (480) that is padded by repetitive padding, for example, based on the MCP area such as described in FIG. 4A.

Referring to FIGS. 4A-4B, when motion compensation with an MV pointing to a block outside a frame boundary (or a picture boundary) of a reference picture (e.g., (401) or (451)), padded pixels in the repetitive padding area (410) or in the extended area (e.g., including the repetitive padding area (480) and the MCP area (470)) in FIG. 4B can be used as reference pixels.

Figure 5:
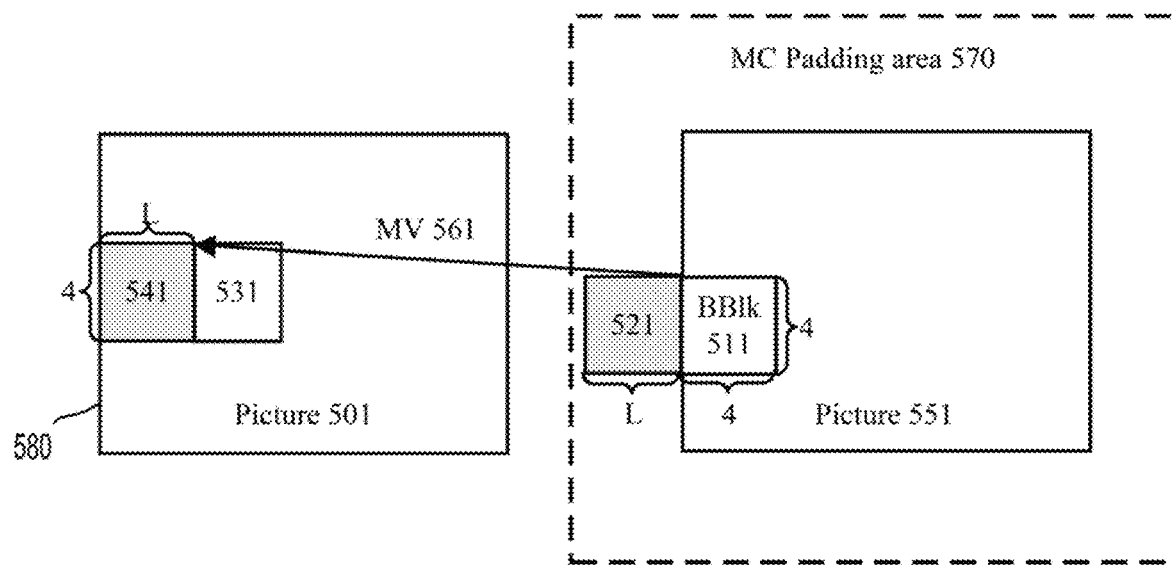
FIG. 5 shows an example illustrating motion compensation boundary padding.

FIG. 5 shows an example illustrating motion compensation (MC) boundary padding. In the MC boundary padding, a MV (561) can be derived based on a boundary block (BBlk) (e.g., a 4×4 boundary block) (511) in a picture (551). For example, the MV (561) is determined based on motion information of the boundary block (511). If the boundary block (511) is intra coded, the motion information of the boundary block (511) is not available, and a zero MV can be used. For example, the MV (561) is set to be the zero MV.

If the boundary block (511) is coded with bi-directional inter prediction, the motion information of the boundary block (511) can include two MVs, such as a first MV pointing to a first pixel position in a first reference picture and a second MV pointing to a second pixel position in a second reference picture. In an example, only one MV (e.g., the first MV or the second MV) is used in the MC boundary padding. The MV being used in the MC boundary padding can point to a pixel position farther away from a picture boundary in a reference picture of the picture (551). For example, if the first pixel position is farther away from a first picture boundary in the first reference picture of the picture (551) than the second pixel position being away from a second picture boundary in the second reference picture of the picture (551), the first MV is used (e.g., the MV (561) is the first MV). Otherwise, the second MV can be used (e.g., the MV (561) is the second MV).

The MV (561) can be utilized to derive a padding block (or an MCP block) (e.g., an L×4 or 4×L padding block) (521) in an MC padding area (570) of the picture (551). For example, the MV (561) points to a reference block (also referred to as a reference boundary block or Ref BBlk) (531) in a reference picture (501) of the picture (551). An MCP reference block (541) in the reference picture (501) that is adjacent to the reference block (531) can be used to determine the MCP block (521). A size of the MCP reference block (541) can be equal to a size of the MCP block (521). In an example, a size of the reference block (531) is equal to a size of the boundary block (511).

In some examples, pixels in an MC padding block (e.g., the MCP block (521)) are modified (e.g., corrected) with an offset (e.g., a DC offset or a DC offset value). The offset can be determined based on samples in the reconstructed boundary block (e.g., the boundary block (511) in FIG. 5) in the picture (551) and reference samples in a corresponding reference block (e.g., the Ref BBlk (531) in FIG. 5) in the reference picture (501). The offset can be equal to a difference between DC values (e.g., average pixel values) of the reconstructed boundary block (e.g., the boundary block (511)) in the picture (551) and the corresponding reference block (e.g., the Ref BBlk (531)) in the reference picture (501).

The MC boundary padding method described in FIG. 5 can be combined with the repetitive padding method to determine an extended area of the picture (551), such as described in FIG. 4B to determine the extended area of the reference picture (451). The value L can indicate a desired frame boundary extension (or the desired picture boundary extension).

In an example, two different padded area sizes, such as 64 (shown in FIG. 4B) and 16, are implemented. L can be set at least equal to 4 if the MV (561) points to a position internal to the reference picture bounds. In an example, if L is less than 64, the remaining portion of the MC padding area (570) can be filled with the repetitive padded samples by using repetitive padding such as described in FIG. 4A.

In related examples, the fractional motion compensation is utilized to determine an MCP block (e.g., an L×4 block), such as the MCP block (521) in the picture (551), for example, if the MV (561) has a fractional precision part. In some examples, more than L×4 pixels are to be fetched from memory for the MC padding when the fractional motion compensation is utilized to determine an L×4 MCP block. The computational complexity and the memory bandwidth access can be significant when the fractional motion compensation is utilized. Because of the complicated motion compensation operation, a simple DMA method may not be applied to the fractional motion compensation.

According to an embodiment of the disclosure, an MV with an integer-sample (or integer-pel) precision (e.g., 1-pel) can be used in the MC padding process for a picture. When an MV associated with a block (e.g., an MCP block or an MC padded block) to be MC padded is in the integer precision, a MCP reference block to which the integer MV points can be directly copied from a reference picture without fractional motion compensation. When the MV for the MCP block (or the MV that is associated with the MCP block) to be MC padded is in a fractional precision, an integer-pel MV associated with the MCP block can be generated based on the MV associated with the MCP block that has the fractional precision. In an embodiment, the MV (e.g., the MV (561)) associated with the MCP block can be determined based on motion information of a boundary block (e.g., the boundary block (511)), such as described in FIG. 5. The boundary block can be adjacent to the MCP block. The boundary block and the MCP block can be separated by a picture boundary of the picture, the boundary block can be within the picture, and the MCP block can be outside the picture.

In an embodiment, the MV associated with the MCP block (e.g., the MV (561) for the MCP block (521)) has the fractional precision, the MV associated with the MCP block can be clipped (e.g., by a simple clipping operation) to generate a final MV that has the integer precision. The clipping operation can be applied to a value of a component of the MV associated with the MCP block. For example, a value of an X component of the MV is clipped to only keep an integer sample precision part and a fraction precision part of the value of the X component of the MV is discarded. For example, a value of a Y component of the MV is clipped to only keep an integer sample precision part and a fraction precision part of the value of the Y component of the MV is discarded.

The MV associated with the MCP block (e.g., the MV (561) of the MCP block (521)) has the fractional precision, and the MV associated with the MCP block can be rounded to generate a final MV that has the integer precision.

In an embodiment, the MV associated with the MCP block can be rounded towards zero. A value of an X component of the MV can be rounded towards 0, for example, if the X component of the MV has a fractional precision part. A value of a Y component of the MV can be rounded towards 0, for example, if the Y component of the MV has a fractional precision part.

In an embodiment, the MV associated with the MCP block can be rounded towards positive infinity or negative infinity to obtain the final MV associated with the MCP block. In an example, the MV associated with the MCP block is rounded towards positive infinity. A value of an X component of the MV is rounded towards positive infinity, for example, if the X component of the MV has a fractional precision part. A value of a Y component of the MV is rounded towards positive infinity, for example, if the Y component of the MV has a fractional precision part.

In an example, the MV associated with the MCP block is rounded towards negative infinity. A value of an X component of the MV can be rounded towards negative infinity, for example, if the X component of the MV has a fractional precision part. A value of a Y component of the MV can be rounded towards negative infinity, for example, if the Y component of the MV has a fractional precision part.

In an embodiment, sign-based rounding can be applied to the MV associated with the MCP block to generate the final MV having the integer precision. If a component (e.g., the X component or the Y component) of the MV is positive, the positive component of the MV can be rounded towards positive infinity, for example, if the positive component of the MV has a fractional precision part. If a component of the MV is negative, the negative component of the MV can be rounded towards negative infinity, for example, if the negative component of the MV has a fractional precision part.

Referring to FIG. 5, reference samples (or MCP reference samples) in an MCP reference block (e.g., the MCP reference block (541)) in a reference picture (e.g., the reference picture (501)) to which the final MV (or the integer MV) points can be used to determine an MCP block (e.g., the MCP block (521)) in an MC padding area (e.g., the MC padding area (570)) of a picture (e.g., the picture (551)). Referring to FIG. 5, if the MV (561) is the final MV with the integer precision, only L×4 samples are used to determine the MCP block (521). If the MV (561) is the MV with the fractional precision, more than L×4 samples are used to determine the MCP block (521), for example, due to interpolation. Thus, performing the full pixel motion compensation padding with the final MV can be more efficient (e.g., with less memory bandwidth and less computational complexity) than the fractional motion compensation padding with the MV. The DMA can be used in the full pixel motion compensation padding.

In an embodiment, the reference samples in the MCP reference block (e.g., the MCP reference block (541)) can be copied from the reference picture (e.g., the reference picture (501)) and used as MC padding pixels directly. For example, the MC padding pixels in the MCP block (e.g., the MCP block (521)) are copied directly from the MCP reference block.

The reference samples in the MCP reference block (e.g., the MCP reference block (541)) can be calibrated, for example, with offset(s) (or offset value(s)), and the calibrated reference samples (or the reference samples with calibration) can be used as the MC padding pixels. For example, the MC padding pixels in the MCP block (e.g., the MCP block (521)) are based on the reference samples in the MCP reference block (e.g., the MCP reference block (541)) and an offset.

In an example, an offset, such as a DC offset, is used in the calibration process. For example, the DC offset is determined based on a difference between a first DC value (e.g., an average pixel value) of the boundary block (e.g., the boundary block (511)) and a second DC value (e.g., an average pixel value) of a reference block (e.g., the reference block (531)) of the boundary block that is in the reference picture. In an example, the first DC value is an average of pixel values of pixels (or samples) in the boundary block (e.g., the boundary block (511)), and the second DC value is an average of pixel values of reference pixels (or reference samples) in the reference block (e.g., the reference block (531)) in the reference picture.

The reference block can be determined based on the MV for the MCP block or the final MV (the integer MV). The DC offset can be applied to the reference samples in the MCP reference block. For example, the DC offset is added to the reference samples in the MCP reference block to determine the MC padding pixels in the MCP block.

In an embodiment, an offset may be signalled for an MCP block or a boundary block associated with the MCP block. For example, an offset is signalled for each MCP block or each boundary block associated with the respective MCP block.

In an embodiment, an offset may be signalled for a group of MCP blocks or a group of boundary blocks associated with the group of MCP blocks. In an example, the group of boundary blocks includes multiple boundary blocks that are within the picture and are adjacent to the picture boundary. The group of MCP blocks can include MCP blocks that are in the MCP padding area of the picture and are adjacent to the picture boundary. In an example, each boundary block in the group of boundary blocks is adjacent to a respective MCP block in the group of MCP blocks. For example, an offset is signalled for each group of MCP blocks or each group of boundary blocks.

Other MCP block(s) in the MCP area (570) can be determined using the full-pixel motion compensation padding described for the MCP block (521). Thus, the MCP area (570) can be determined by the full-pixel motion compensation padding that is more efficient than the fractional motion compensation padding. An extended area of the picture (551) can include the MCP area (570). The picture (and the extended area) can be used as a reference picture to code (e.g., reconstruct) another picture.

According to an embodiment of the disclosure, an MV used in motion compensation padding can be determined based on multiple pieces of motion information of a group of blocks, such as consecutive blocks (e.g., consecutive 4×4 blocks). In an embodiment, multiple MVs of the consecutive blocks are grouped into the MV. For example, n consecutive blocks (e.g., the consecutive 4×4 blocks) along the picture boundary are merged into one 4n×4 block (e.g., in one row) or one 4×4n block (e.g., in one column). n can be an integer that is larger than 1. The n consecutive blocks can include n boundary blocks within the picture that are adjacent to the picture boundary.

An MV of one of the consecutive blocks can be determined, for example, as described in FIG. 5. In an embodiment, for the MC padding, the MV associated with the 4n×4 block or the 4×4n block can be determined based on the multiple MVs of the respective consecutive blocks. For example, the MV associated with the 4n×4 block or the 4×4n block can be determined based on an average or a weighted average of the multiple MVs of the respective consecutive blocks. The MV associated with the 4n×4 block or the 4×4n block can be determined based on a median filter of the multiple MVs of the respective consecutive blocks, for example, when n is larger than 2. The MV associated with the 4n×4 block or the 4×4n block can indicate an MCP reference block in a reference picture of the picture. An MCP block in an MC padding area can be determined based on reference samples in the MCP reference block. The MC padding area can be outside the picture and is adjacent to a picture boundary. The MCP block can be adjacent to the 4n×4 block or the 4×4n block. In an example, the MCP block and the MCP reference block have a size of 4n×L block or the L×4n. L can be a suitable integer, such as 4, 16, or 64.

In an example, the MV associated with the 4n×4 block or the 4×4n block has a fractional precision and is used to determine the MCP reference block and then the MCP block with the fractional motion compensation padding. In an example, the MV associated with the 4n×4 block or the 4×4n block has a fractional precision, and thus is clipped or rounded to obtain an MV that has the integer precision. The MV with the integer precision that is associated with the 4n×4 block or the 4×4n block can be used to determine the MCP reference block and then the MCP block with the full-pixel motion compensation padding.

Figure 6:
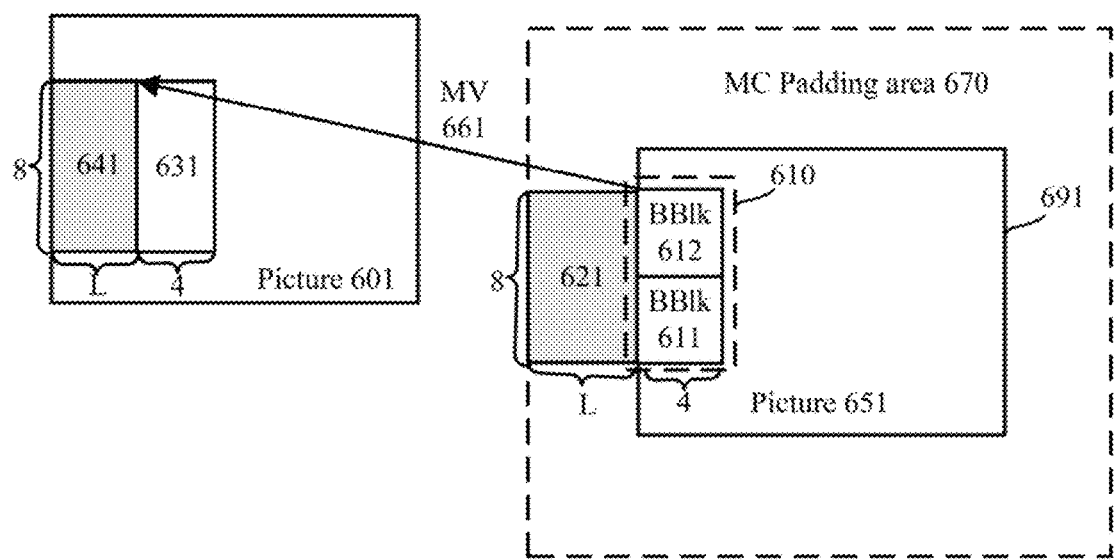
FIGS. 6-8 show examples illustrating group-based motion compensation boundary padding.
Figure 7:
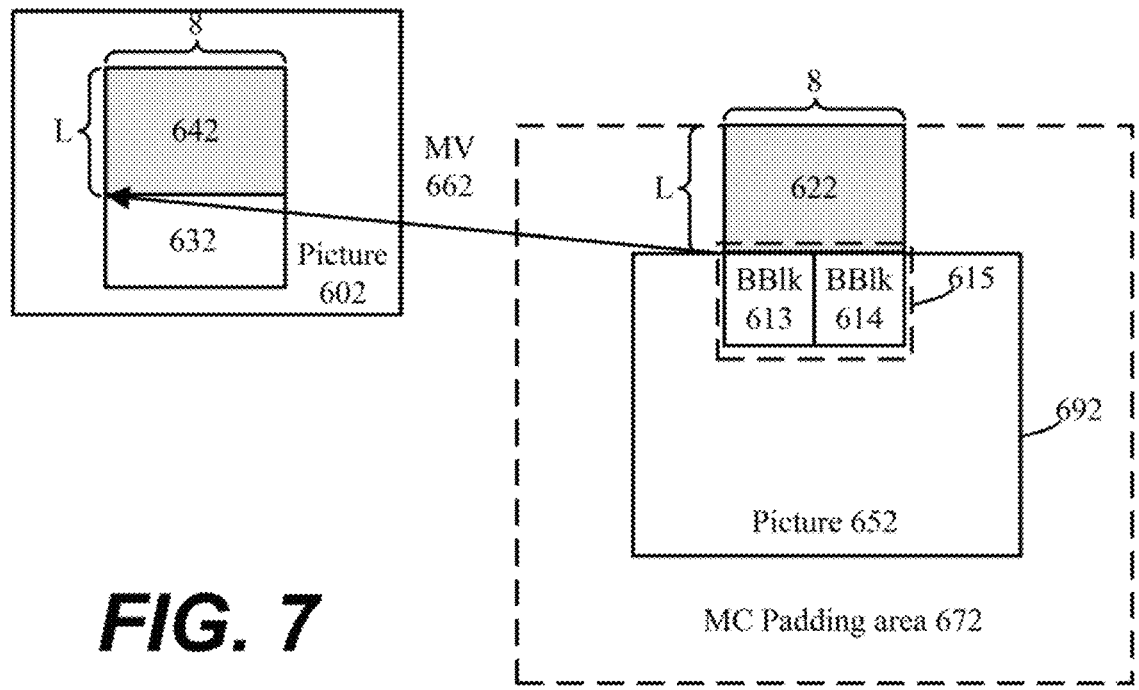
Figure 8:
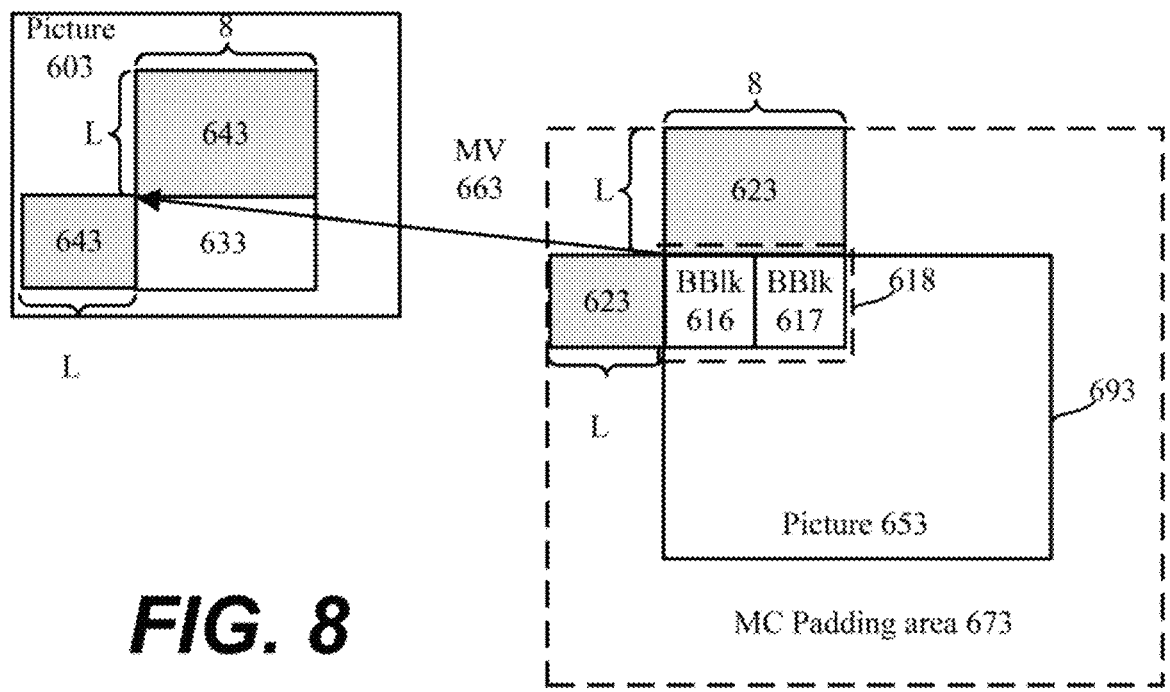

The consecutive blocks (e.g., the consecutive 4×4 blocks) can include consecutive blocks in a column (e.g., a left column, a right column) of the picture, such as shown in FIG. 6. The consecutive blocks can include consecutive blocks in a row (e.g., a top row, a bottom row) of the picture, such as shown in FIG. 7. The consecutive blocks can include a corner block (or a corner boundary block) of the picture and at least a neighbouring block (or a neighbouring boundary block) of the corner block, such as shown in FIG. 8.

In an embodiment, a DC offset value for MC padding for each MCP block (e.g., a 4n×L block or an L×4n block) can be determined based on a difference between an average pixel value of the 4n×4 block or the 4×4n block in the picture and an average pixel value of the corresponding reference block (e.g., a 4n×4 block or a 4×4n block) in the reference picture.

The consecutive blocks or the n consecutive blocks can include boundary blocks in a same column (e.g., a left column or a right column) in the picture, such as shown in FIG. 6. Referring to FIG. 6, boundary blocks (611)-(612) in a picture (651) are in the left column of the picture (651). The boundary block (611) can have a first MV and the boundary block (612) can have a second MV. The boundary blocks (611)-(612) can be merged into a block (610). An MV (661) associated with the block (610) can be determined based on an average of the first MV and the second MV, such as a weighted average of the first MV and the second MV. The MV (661) can indicate an MCP reference block (641) and a reference block (631) in a reference picture (601) of the picture (651). An MCP block (621) in an MC padding area (670) can be determined based on reference samples in the MCP reference block (641). The MC padding area (670) can be outside the picture (651) and is adjacent to a picture boundary (691). The MCP block (621) can be adjacent to the block (610). The reference block (631) can correspond to the block (610). In an example, a size of each of the boundary blocks (611)-(612) is 4×4. Thus, the block (610) and the reference block (631) include 4 columns and 8 rows, and the MCP block (621) and the MCP reference block (641) include L columns and 8 rows. L can be a suitable integer, such as 4, 16, or 64.

The consecutive blocks or the n consecutive blocks can include boundary blocks in a same row (e.g., a top row or a bottom row) in the picture, such as shown in FIG. 7. Referring to FIG. 7, boundary blocks (613)-(614) in a picture (652) are in the top row of the picture (652). The boundary block (613) can have a third MV and the boundary block (614) can have a fourth MV. The boundary blocks (613)-(614) can be merged into a block (615). An MV (662) associated with the block (615) can be determined based on an average of the third MV and the fourth MV, such as a weighted average of the third MV and the fourth MV. The MV (662) can indicate an MCP reference block (642) and a reference block (632) in a reference picture (602) of the picture (652). An MCP block (622) in an MC padding area (672) can be determined based on reference samples in the MCP reference block (642). The MC padding area (672) can be outside the picture (652) and is adjacent to a picture boundary (692). The MCP block (622) can be adjacent to the block (615). The reference block (632) can correspond to the block (615). In an example, a size of each of the boundary blocks (613)-(614) is 4×4. Thus, the block (615) and the reference block (632) include 8 columns and 4 rows, and the MCP block (622) and the MCP reference block (642) include 8 columns and L rows. L can be a suitable integer, such as 4, 16, or 64.

In an embodiment, the above description with reference to FIG. 7 can be applied to a top row and/or a bottom row of a picture. In an embodiment, the n consecutive blocks (e.g., the n consecutive 4×4 blocks) along a portion of the top row or the entire top row of the picture boundary are merged into a 4n×4 block (e.g., a top 4n×4 block). In an embodiment, the consecutive blocks along a portion of the bottom row or the entire bottom row of the picture boundary are merged into a 4n×4 block (e.g., a bottom 4n×4 block). A MV associated with the top 4n×4 block (e.g., the block (615)) can point to a corresponding 4n×4 block (e.g., the reference block (632)) in a reference picture (e.g., the picture (602)) and a first MCP reference block (e.g., the MCP reference block (642)) in the reference picture. Reference samples within the first MCP reference block are used as padding pixels along the top row of the picture boundary. A MV associated with the bottom 4n×4 block can point to a corresponding 4n×4 block and a second MCP reference block in the reference picture. Reference samples within the second MCP reference block are used as padding pixels along the bottom row of the picture boundary. In an example, along the left picture boundary and the right picture boundary, motion information (e.g., an MV) of each 4×4 boundary block in the picture can be used to obtain MC padding pixels which are padded outside the picture boundary to a left side of the picture boundary and to a right side of the picture boundary, such as described in FIG. 5.

The consecutive blocks or the n consecutive blocks can include a corner block (or a corner boundary block) in the picture, such as shown in FIG. 8. Referring to FIG. 8, the consecutive blocks (616)-(617) in a picture (653) include the corner block (616) and the neighbouring boundary block (617). The consecutive blocks (616)-(617) can be merged into a block (618). An MV (663) associated with the block (618) can be determined based on MVs of the respective consecutive blocks (616)-(617), such as described with reference to FIGS. 6-7. The MV (663) can indicate an MCP reference block (643) and a reference block (633) in a reference picture (603) of the picture (653). An MCP block (623) in an MC padding area (673) can be determined based on reference samples in the MCP reference block (643). The MC padding area (673) can be outside the picture (653) and is adjacent to a picture boundary (693). The MCP block (623) can be adjacent to the block (618). The reference block (633) can correspond to the block (618). In an example, a size of each of the consecutive blocks (616)-(617) is 4×4. Thus, the block (618) and the reference block (633) include 8 columns and 4 rows. Each the MCP block (623) and the MCP reference block (643) can include a top portion of 8 columns and L rows and a left portion of L columns and 4 rows. L can be a suitable integer, such as 4, 16, or 64.

According to an embodiment of the disclosure, a filtering process can be applied to one or more padded samples in an MC padding area (e.g., (570), (670), (672), or (673)). In an embodiment, boundary sample filtering is applied to padded sample(s) in the MC padding area using spatially neighbouring samples that are located within the picture (e.g., (551), (651), (652), or (653)).

The boundary sample filtering can be applied as a weighted average of the padded samples outside the picture and the neighbouring reconstructed samples within the picture boundary. In embodiment, a padded sample (or the current padded sample to be filtered) in the MC padding area is filtered based on the padded sample and one or more reconstructed samples within the picture (e.g., at least one sample within the picture that is within N1 lines of the picture boundary of the picture). For example, the filtered padded sample is a weighted average of the padded sample in the MC padding area and the one or more reconstructed samples within the picture.

A weight of one of the one or more reconstructed samples used in the boundary sample filtering can depend on a distance between the current padded sample and the one of the one or more reconstructed samples that is within the picture and is used as an input to filter the current padded sample. For example, the current padded sample to be filtered is to the left (e.g., in a column −1) of the picture, and the one or more reconstructed samples used in the boundary sample filtering are in a same row as the current padded sample and are located in consecutive columns 0 to (N1-1) in the picture. N1 is larger than 0. The consecutive columns can include the left column (e.g., the column 0) of the picture. Weights $W_0$-$W_{N1}$ of the one or more reconstructed samples in the respective consecutive columns 0 to (N1-1) can decrease with the column numbers. For example, the weight $W_0$ is the largest and the weight $W_{N1}$ is the smallest in the weights $W_0$-$W_{N1}$.

In an embodiment, the MC padding area includes first padded samples and second padded samples. The first padded samples are within N2 lines of the picture boundary, and the second padded samples are outside the N2 lines of the picture boundary. The first padded samples can be filtered as described above. The second padded samples are not filtered.

For example, only padded samples outside the picture but closer to the picture boundary are filtered. For example, the padded samples within N2 rows of the picture boundary (e.g., the padded samples within N2 rows above the picture and within N2 rows below the picture) and the padded samples within N2 columns of the picture boundary (e.g., the padded samples within N2 columns to the left of the picture and within N2 columns to the right of the picture) can be filtered. N2 can be a positive integer. Values of N2 can include but are not limited to 1, 2, 3, 4, and the like.

Figure 9:
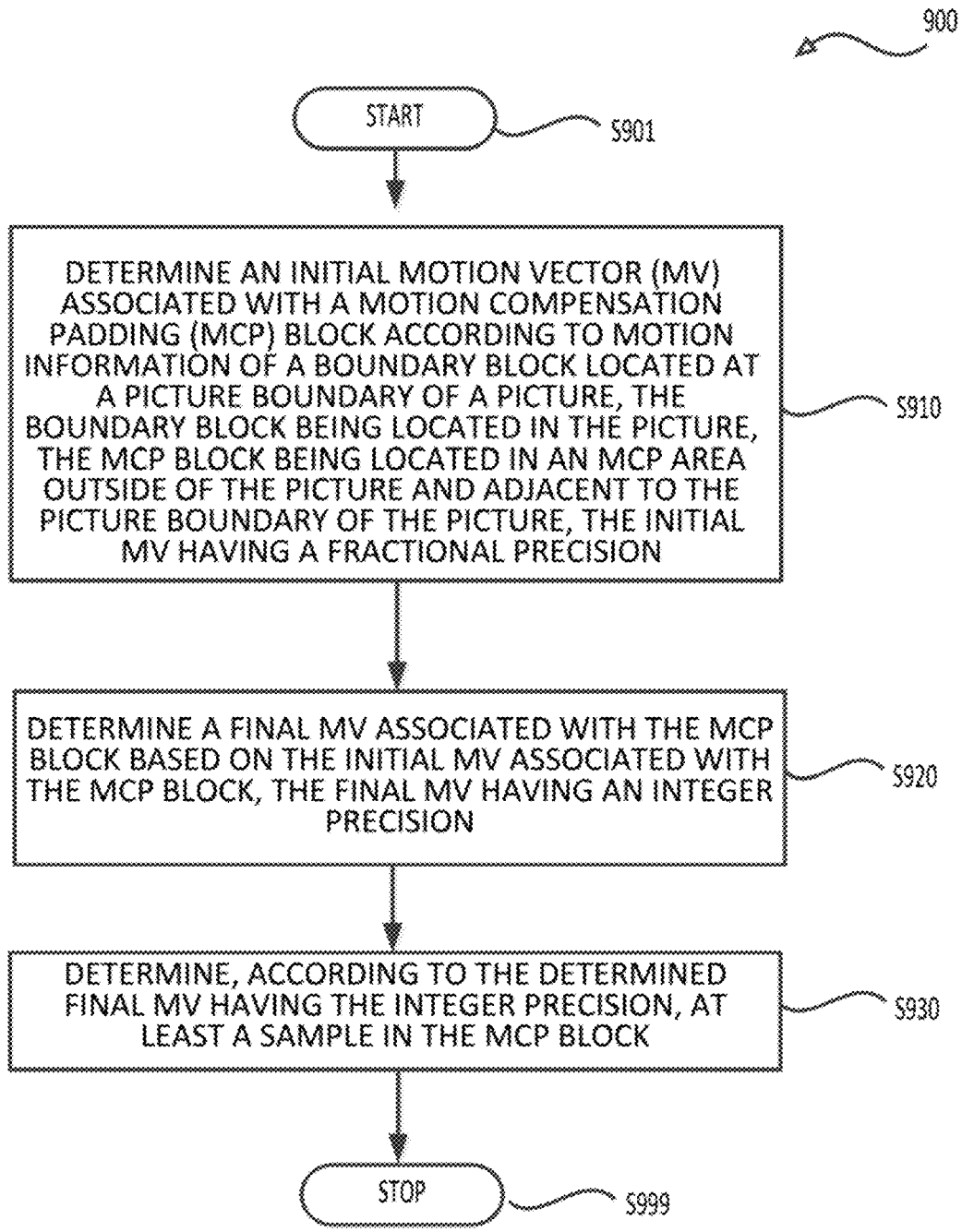
FIG. 9 shows an exemplary flow chart outlining an encoding process.

FIG. 9 shows a flow chart outlining a process (900) according to an embodiment of the disclosure. The process (900) can be used in a video encoder. In various embodiments, the process (900) is executed by processing circuitry, such as the processing circuitry that performs functions of the video encoder (103), the processing circuitry that performs functions of the video encoder (303), and the like. In some embodiments, the process (900) is implemented in software instructions, thus when the processing circuitry executes the software instructions, the processing circuitry performs the process (900). In an example, the process (900) implements a full pixel motion compensation padding or the full pixel MC padding. The process starts at (S901) and proceeds to (S910).

At (S910), an initial motion vector (MV) associated with a motion compensation padding (MCP) block can be determined according to motion information of a boundary block located at a picture boundary of a picture, such as described in FIG. 5. The boundary block can be located in the picture, and the MCP block can be located in an MCP area outside of the picture and adjacent to the picture boundary of the picture. The initial MV can have a fractional precision.

At (S920), a final MV associated with the MCP block can be determined based on the initial MV associated with the MCP block. The final MV can have an integer precision.

In an embodiment, the final MV associated with the MCP block is determined by clipping the initial MV to the integer precision. In an embodiment, the final MV associated with the MCP block is determined by rounding the initial MV towards zero. In an embodiment, the final MV associated with the MCP block is determined by rounding the initial MV towards a positive infinity or a negative infinity. In an embodiment, the initial MV includes an X-component and a Y-component, and the final MV is determined by rounding the initial MV. For each of the X-component and the Y-component that has the fractional precision, if the component has a positive value, the component can be rounded towards positive infinity. If the component has a negative value, the component can be rounded towards negative infinity.

At (S930), at least a sample in the MCP block can be determined according to the determined final MV having the integer precision. For examples, samples in the MCP block are determined using the full pixel MC padding. In an embodiment, a MCP reference block for the MCP block is determined according to the final MV associated with the MCP block. The MCP reference block is in a reference picture of the picture. The MCP block can be determined according to the MCP reference block. In an example, the samples in the MCP block can be determined by directly copying reference samples in the MCP reference block. In an example, an offset (e.g., a DC offset value) is determined based on a difference between an average pixel value of the boundary block and an average pixel value of a reference block of the boundary block that is in the reference picture. The offset can be applied to at least the sample in the MCP block. For examples, the offset can be added to the samples in the MCP block that are determined by directly copying the reference samples in the MCP reference block to obtain the final samples in the MCP block.

In an example, one or more samples in the MCP block are filtered based on at least one sample within the picture that is within N1 lines of the picture boundary of the picture.

In an example, the offset and the filtering described above are applied to at least the sample in the MCP block.

Then, the process proceeds to (S999) and terminates. The process (900) can be suitably adapted. Step(s) in the process (900) can be modified and/or omitted. Additional step(s) can be added. Any suitable order of implementation can be used. In an example, coding information indicating the offset is encoded. The encoded coding information can be included in a bitstream.

Figure 10:
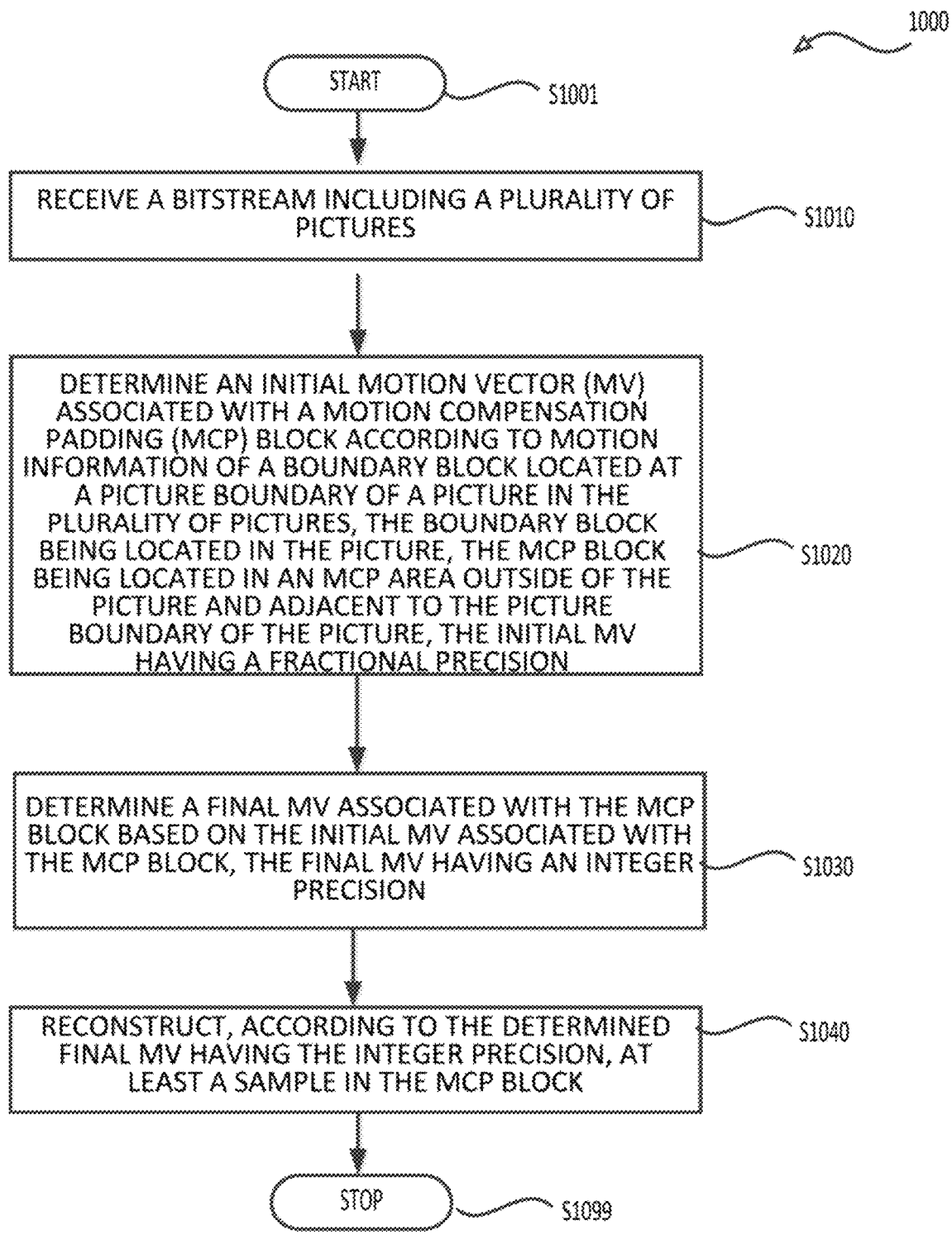
FIGS. 10-12 show exemplary flow charts outlining decoding processes.

FIG. 10 shows a flow chart outlining a process (1000) according to an embodiment of the disclosure. The process (1000) can be used in a video decoder. In various embodiments, the process (1000) is executed by processing circuitry, such as the processing circuitry that performs functions of the video decoder (110), the processing circuitry that performs functions of the video decoder (210), and the like. In some embodiments, the process (1000) is implemented in software instructions, thus when the processing circuitry executes the software instructions, the processing circuitry performs the process (1000). The process (1000) starts at (S1001) and proceeds to (S1010). In an example, the process (1000) implements a full pixel motion compensation padding or the full pixel MC padding.

At (S1010), a bitstream including a plurality of pictures is received.

At (S1020), an initial motion vector (MV) associated with a motion compensation padding (MCP) block can be determined according to motion information of a boundary block located at a picture boundary of a picture in the plurality of pictures, such as described in FIG. 5. The boundary block can be located in the picture, and the MCP block can be located in an MCP area outside of the picture and adjacent to the picture boundary of the picture. The initial MV can have a fractional precision.

At (S1030), a final MV associated with the MCP block can be determined based on the initial MV. The final MV can have an integer precision for the full pixel MC padding. In an embodiment, the final MV is determined by clipping the initial MV to the integer precision. In an embodiment, the final MV is determined by rounding the initial MV towards zero. In an embodiment, the final MV is determined by rounding the initial MV towards a positive infinity or a negative infinity. In an embodiment, the initial MV includes an X-component and a Y-component, and the final MV is determined by rounding the initial MV. For each of the X-component and the Y-component that has the fractional precision, if the component has a positive value, the component can be rounded towards positive infinity. If the component has a negative value, the component can be rounded towards negative infinity.

At (S1040), at least a sample in the MCP block can be reconstructed according to the determined final MV having the integer precision. For examples, samples in the MCP block are reconstructed using the full pixel MC padding.

In an embodiment, a MCP reference block for the MCP block is determined according to the final MV associated with the MCP block. The MCP reference block is in a reference picture of the picture. The MCP block can be reconstructed according to the MCP reference block. In an example, the samples in the MCP block can be determined by directly copying reference samples in the MCP reference block. In an example, an offset (e.g., a DC offset value) is determined based on a difference between an average pixel value of the boundary block and an average pixel value of a reference block of the boundary block that is in the reference picture. In an example, coding information is signaled and is received by a decoder (e.g., a video decoder), and the coding information can indicate the offset. The offset can be applied to at least the sample in the MCP block. For examples, the offset can be added to the samples in the MCP block that are determined by directly copying the reference samples in the MCP reference block to obtain the final samples in the MCP block.

In an example, one or more samples in the MCP block are filtered based on at least one sample within the picture that is within N1 lines of the picture boundary of the picture.

In an example, the offset and the filtering described above are applied to at least the sample in the MCP block.

Then, the process proceeds to (S1099) and terminates. The process (1000) can be suitably adapted. Step(s) in the process (1000) can be modified and/or omitted. Additional step(s) can be added. Any suitable order of implementation can be used. The MCP area can be determined, for example, by determining MCP block(s) in the MCP area using steps in the process (1000). An extended area of the picture can include the MCP area. The picture (and the extended area) can be used as a reference picture to code (e.g., reconstruct) another picture. In an example, the extended area of the picture includes a repetitive padding area (e.g., (480)), as described in FIG. 4B.

Figure 11:
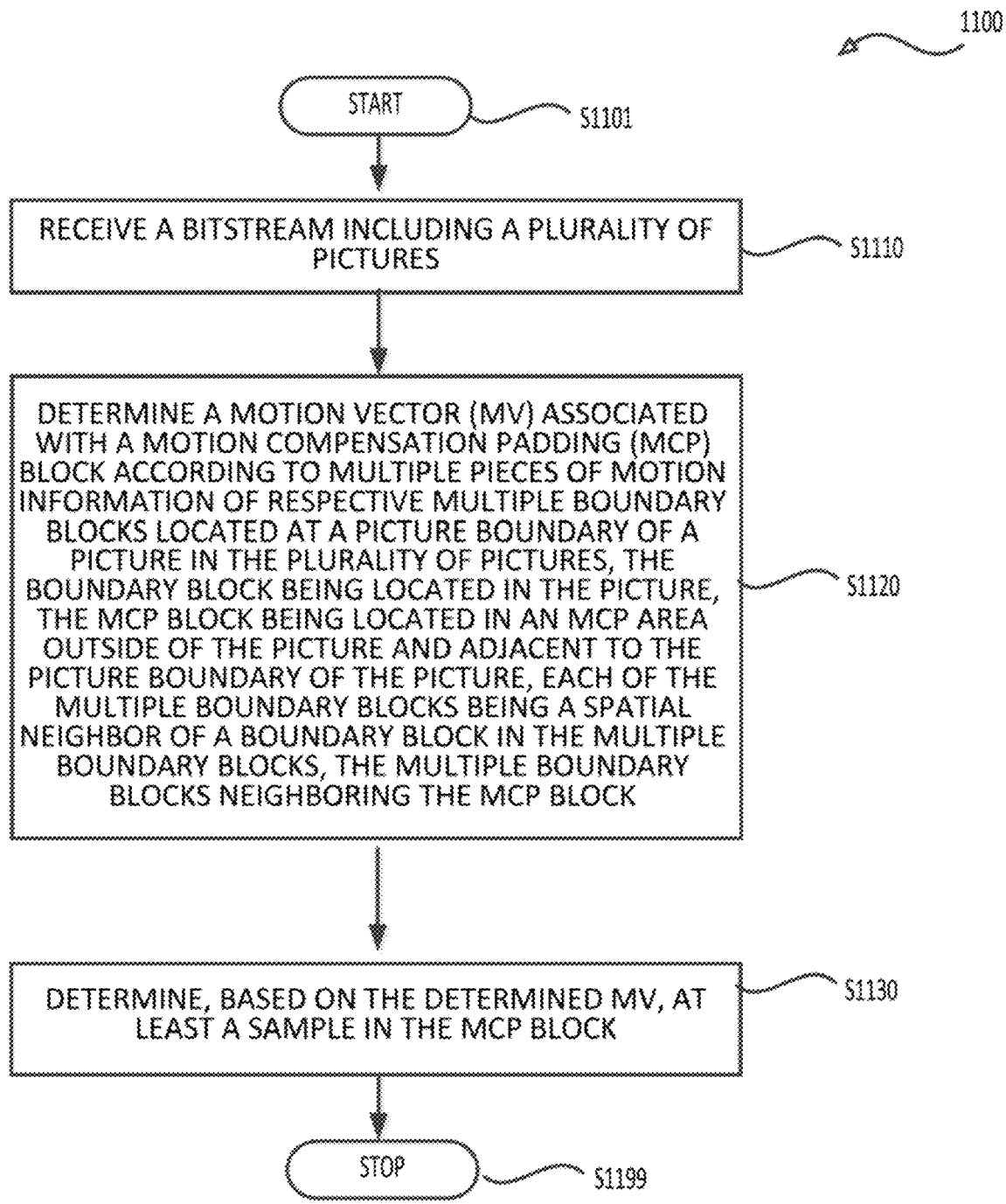

FIG. 11 shows a flow chart outlining a process (1100) according to an embodiment of the disclosure. The process (1100) can be used in a video/image coder, such as a video decoder. In various embodiments, the process (1100) is executed by processing circuitry, such as the processing circuitry that performs functions of the video decoder (110), the processing circuitry that performs functions of the video decoder (210), and the like. In some embodiments, the process (1100) is implemented in software instructions, thus when the processing circuitry executes the software instructions, the processing circuitry performs the process (1100). The process (1100) starts at (S1101) and proceeds to (S1110).

At (S1110), a bitstream including a plurality of pictures is received.

At (S1120), a motion vector (MV) associated with a motion compensation padding (MCP) block can be determined according to multiple pieces of motion information of respective multiple boundary blocks located at a picture boundary of a picture in the plurality of pictures, such as described with reference to FIGS. 6-8. The multiple boundary blocks can be located in the picture. The MCP block can be located in an MCP area outside of the picture and adjacent to the picture boundary of the picture. Each of the multiple boundary blocks can be a spatial neighbor of a boundary block in the multiple boundary blocks, and the multiple boundary blocks can be spatially adjacent to the MCP block.

In an embodiment, the multiple pieces of motion information include multiple MVs of the respective multiple boundary blocks. In an example, the MV associated with the MCP block is determined by averaging (e.g., a weighted average) the multiple MVs of the respective multiple boundary blocks, such as described with reference to FIGS. 6-7. In an example, the MV associated with the MCP block is determined by applying a median filter to the multiple MVs, for example, when a number of the multiple MVs is larger than 2.

In an example, the picture boundary includes a top picture boundary, a bottom picture boundary, a left picture boundary, and a right picture boundary. In an example, the multiple boundary blocks are located at the top picture boundary. In an example, the multiple boundary blocks are located at the bottom picture boundary. In an example, a size of each of the multiple boundary blocks is 4×4, a number of the multiple boundary blocks is n, and a size of the MCP block is 4n×L. L can be a positive integer, such as 4, 16, or 64.

At (S1130), at least a sample in the MCP block can be determined according to the determined MV. In an embodiment, a MCP reference block for the MCP block is determined according to the determined MV, and the MCP reference block is in a reference picture of the picture. The MCP block can be determined according to the MCP reference block, such as described above.

In an example, an offset is determined based on samples in the multiple boundary blocks and reference samples in multiple reference blocks corresponding to the multiple boundary blocks. In an example, the offset is determined based on a difference of an average pixel value of the multiple boundary blocks and an average pixel value of the multiple reference blocks. The multiple reference blocks can be in the reference picture and can be indicated by the determined MV. The offset can be applied to at least the sample in the MCP block. In an example, the offset and the filtering described above are applied to at least the sample in the MCP block.

In an embodiment, the determined MV associated with the MCP has a fractional precision, a final MV associated with the MCP block with an integer precision is determined based on the determined MV. The MCP block can be determined according to the determined final MV having the integer precision.

Then, the process proceeds to (S1199) and terminates. The process (1100) can be suitably adapted. Step(s) in the process (1100) can be modified and/or omitted. Additional step(s) can be added. Any suitable order of implementation can be used. The process (1100) can be adapted to be used in an encoder (e.g., a video encoder or an image encoder). For examples, steps (S1120) and (S1130) can be used in the encoder.

Figure 12:
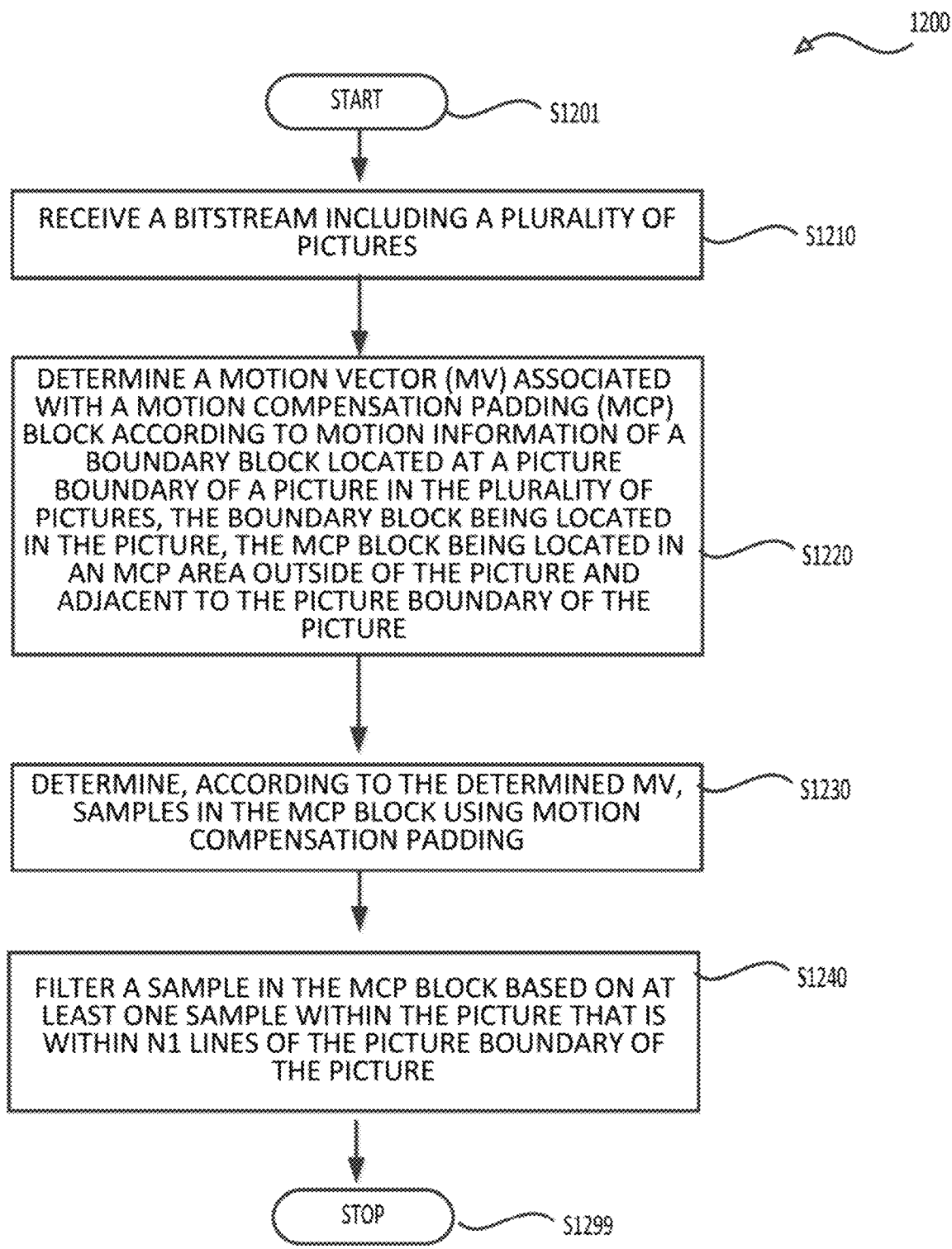

FIG. 12 shows a flow chart outlining a process (1200) according to an embodiment of the disclosure. The process (1200) can be used in a video/image coder, such as a video decoder. In various embodiments, the process (1200) is executed by processing circuitry, such as the processing circuitry that performs functions of the video decoder (110), the processing circuitry that performs functions of the video decoder (210), and the like. In some embodiments, the process (1200) is implemented in software instructions, thus when the processing circuitry executes the software instructions, the processing circuitry performs the process (1200). The process (1200) starts at (S1201) and proceeds to (S1210).

At (S1210), a bitstream including a plurality of pictures is received.

At (S1220), a motion vector (MV) associated with an MCP block can be determined according to motion information of a boundary block located at a picture boundary of a picture in the plurality of pictures. The boundary block is located in the picture, and the MCP block is located in an MCP area outside of the picture and adjacent to the picture boundary of the picture.

At (S1230), samples in the MCP block can be determined according to the determined MV using motion compensation padding. The motion compensation padding can be fractional motion compensation padding if the determined MV has a fractional precision. The motion compensation padding can be full-pixel motion compensation padding if the determined MV (i) has the integer precision or (ii) is clipped or rounded to the integer precision. In an example, an offset is further applied to the samples in the MCP block as described above.

At (S1240), a sample in the MCP block can be filtered based on at least one sample within the picture that is within N1 lines of the picture boundary of the picture. In an example, the sample in the MCP block is filtered based on a weighted average of the sample and the at least one sample within the picture. A weight of a sample in the at least one sample within the picture is based on a distance between (i) the sample in the MCP block and (ii) the sample in the at least one sample within the picture. In an example, the sample in the MCP block is within N2 lines of the picture boundary, and samples in the MCP block that are outside the N2 lines of the picture boundary are not filtered.

Then, the process proceeds to (S1299) and terminates. The process (1200) can be suitably adapted. Step(s) in the process (1200) can be modified and/or omitted. Additional step(s) can be added. Any suitable order of implementation can be used. The process (1200) can be adapted to be used in an encoder (e.g., a video encoder or an image encoder). For examples, steps (S1220), (S1230), and (S1240) can be used in the encoder.

Embodiments in the disclosure may be used separately or combined in any order. Further, each of the methods (or embodiments), an encoder, and a decoder may be implemented by processing circuitry (e.g., one or more processors or one or more integrated circuits). In one example, the one or more processors execute a program that is stored in a non-transitory computer-readable medium.

The techniques described above, can be implemented as computer software using computer-readable instructions and physically stored in one or more computer-readable media.

Figure 13:
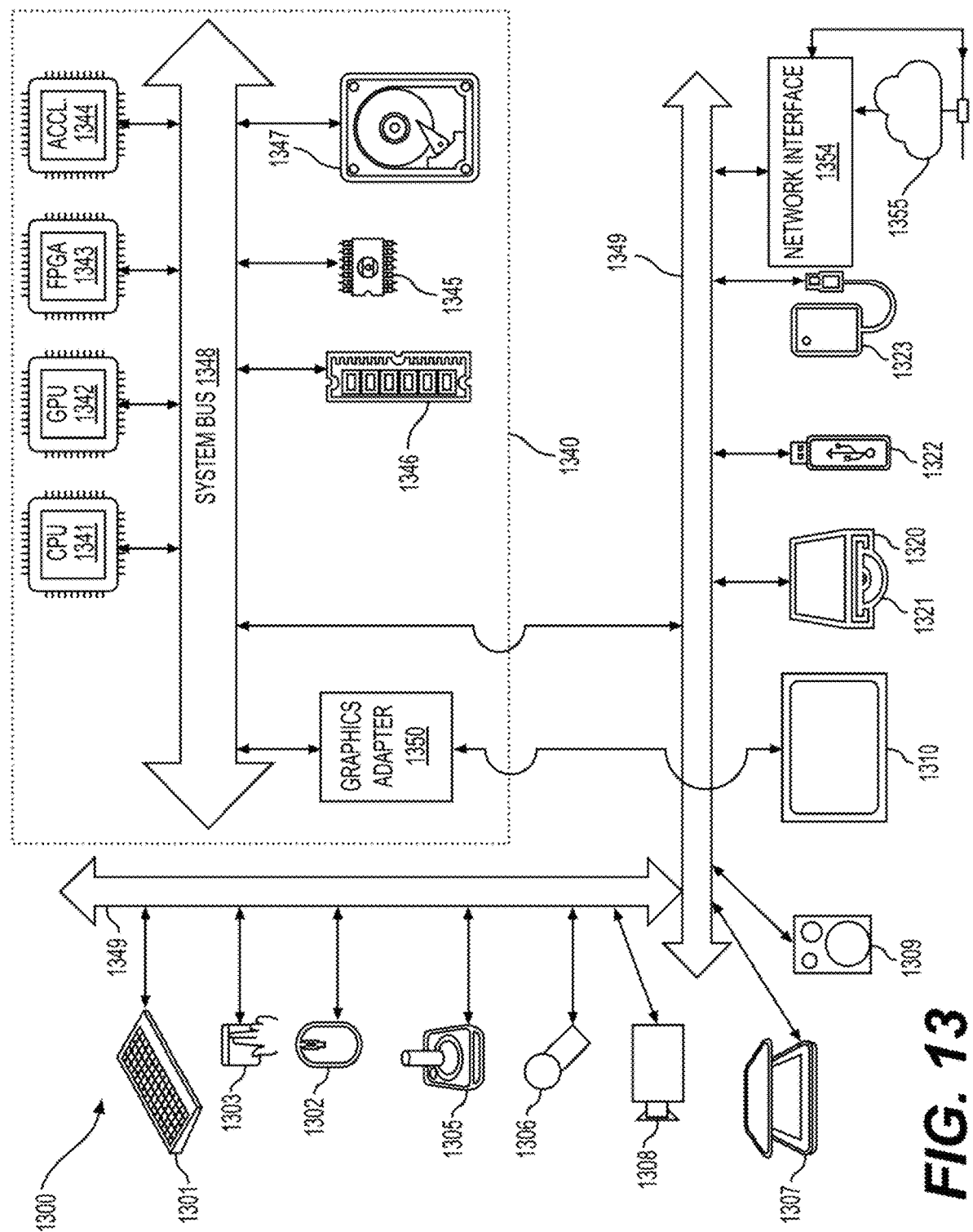
FIG. 13 is a schematic illustration of a computer system in accordance with an embodiment.

For example, FIG. 13 shows a computer system (1300) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

The components shown in FIG. 13 for computer system (1300) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (1300).

Computer system (1300) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (1301), mouse (1302), trackpad (1303), touch screen (1310), data-glove (not shown), joystick (1305), microphone (1306), scanner (1307), camera (1308).

Computer system (1300) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (1310), data-glove (not shown), or joystick (1305), but there can also be tactile feedback devices that do not serve as input devices), audio output devices (such as: speakers (1309), headphones (not depicted)), visual output devices (such as screens (1310) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (1300) can also include human accessible storage devices and their associated media such as optical media including CD/DVD ROM/RW (1320) with CD/DVD or the like media (1321), thumb-drive (1322), removable hard drive or solid state drive (1323), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (1300) can also include an interface (1354) to one or more communication networks (1355). Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (1349) (such as, for example USB ports of the computer system (1300)); others are commonly integrated into the core of the computer system (1300) by attachment to a system bus as described below (for example Ethernet interface into a PC computer system or cellular network interface into a smartphone computer system). Using any of these networks, computer system (1300) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (1340) of the computer system (1300).

The core (1340) can include one or more Central Processing Units (CPU) (1341), Graphics Processing Units (GPU) (1342), specialized programmable processing units in the form of Field Programmable Gate Areas (FPGA) (1343), hardware accelerators for certain tasks (1344), graphics adapters (1350), and so forth. These devices, along with Read-only memory (ROM) (1345), Random-access memory (1346), internal mass storage such as internal non-user accessible hard drives, SSDs, and the like (1347), may be connected through a system bus (1348). In some computer systems, the system bus (1348) can be accessible in the form of one or more physical plugs to enable extensions by additional CPUs, GPU, and the like. The peripheral devices can be attached either directly to the core's system bus (1348), or through a peripheral bus (1349). In an example, the screen (1310) can be connected to the graphics adapter (1350). Architectures for a peripheral bus include PCI, USB, and the like.

CPUs (1341), GPUs (1342), FPGAs (1343), and accelerators (1344) can execute certain instructions that, in combination, can make up the aforementioned computer code. That computer code can be stored in ROM (1345) or RAM (1346). Transitional data can be also be stored in RAM (1346), whereas permanent data can be stored for example, in the internal mass storage (1347). Fast storage and retrieve to any of the memory devices can be enabled through the use of cache memory, that can be closely associated with one or more CPU (1341), GPU (1342), mass storage (1347), ROM (1345), RAM (1346), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (1300), and specifically the core (1340) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (1340) that are of non-transitory nature, such as core-internal mass storage (1347) or ROM (1345). The software implementing various embodiments of the present disclosure can be stored in such devices and executed by core (1340). A computer-readable medium can include one or more memory devices or chips, according to particular needs. The software can cause the core (1340) and specifically the processors therein (including CPU, GPU, FPGA, and the like) to execute particular processes or particular parts of particular processes described herein, including defining data structures stored in RAM (1346) and modifying such data structures according to the processes defined by the software. In addition or as an alternative, the computer system can provide functionality as a result of logic hard-wired or otherwise embodied in a circuit (for example: accelerator (1344)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

The use of "at least one of" or "one of" in the disclosure is intended to include any one or a combination of the recited elements. For example, references to at least one of A, B, or C; at least one of A, B, and C; at least one of A, B, and/or C; and at least one of A to C are intended to include only A, only B, only C or any combination thereof. References to one of A or B and one of A and B are intended to include A or B or (A and B). The use of "one of" does not preclude any combination of the recited elements when applicable, such as when the elements are not mutually exclusive.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method of video decoding in a video decoder, the method comprising:
   receiving a bitstream including a plurality of pictures;
   determining an initial motion vector (MV) associated with an initial motion compensation padding (MCP) block of a boundary block of a picture in the plurality of pictures, the initial MV being from the boundary block to an initial reference boundary block, the initial MV having a fractional precision, wherein the initial MV is determined according to motion information of the boundary block located at a picture boundary of the picture in the plurality of pictures, the boundary block being located in the picture, the initial MCP block being located in an MCP area outside of the picture and adjacent to the picture boundary of the picture;
   generating a final MV having an integer precision from the boundary block to a final reference boundary block based on an X component and a Y component of the initial MV associated with the initial MCP block, an X component of the final MV being equal to the X component of the initial MV rounded to a first integer when the X component of the initial MV is fractional, and a Y component of the final MV being equal to the Y component of the initial MV rounded to a second integer when the Y component of the initial MV is fractional, wherein the final MV is associated with a final MCP block; and
   reconstructing, according to the generated final MV having the integer precision, at least a sample in the boundary block.

2. The method of claim 1, wherein
   when the X or Y component is a positive value, the generating the final MV includes rounding the X or Y component towards positive infinity; and
   when the X or Y component is a negative value, the generating the final MV includes rounding the X or Y component towards negative infinity.

3. The method of claim 1, wherein the reconstructing further comprises:
   reconstructing the boundary block according to the final MCP block.

4. The method of claim 3, wherein the reconstructing the boundary block further comprises:
   determining an offset based on a difference between an average pixel value of the boundary block and an average pixel value of the final reference boundary block of the boundary block that is in the reference picture; and
   applying the offset to at least a sample in the final MCP block.

5. The method of claim 3, wherein
   the method includes receiving coding information indicating an offset; and
   the method further comprises:
   applying the offset to at least a sample in the final MCP block.

6. The method of claim 3, further comprising:
   filtering the sample in the final MCP block based on at least one sample within the picture that is within N1 lines of the picture boundary of the picture.

7. A method of video encoding in a video encoder, the method comprising:
   determining an initial motion vector (MV) associated with an initial motion compensation padding (MCP) block of a boundary block of a picture in a plurality of pictures, the initial MV being from the boundary block to an initial reference boundary block, the initial MV having a fractional precision, wherein the initial MV is determined according to motion information of the boundary block located at a picture boundary of the picture in the plurality of pictures, the boundary block being located in the picture, the initial MCP block being located in an MCP area outside of the picture and adjacent to the picture boundary of the picture;
   generating a final MV having an integer precision from the boundary block to a final reference boundary block based on an X component and a Y component of the initial MV associated with the initial MCP block, an X component of the final MV being equal to the X component of the initial MV rounded to a first integer when the X component of the initial MV is fractional, and a Y component of the final MV being equal to the Y component of the initial MV rounded to a second integer when the Y component of the initial MV is fractional, wherein the final MV is associated with a final MCP block; and encoding, according to the generated final MV having the integer precision, at least a sample in the boundary block.

8. The method of claim 7, wherein when the X or Y component is a positive value, the generating the final MV includes rounding the X or Y component towards positive infinity; and when the X or Y component is a negative value, the generating the final MV includes rounding the component towards negative infinity.

9. The method of claim 7, wherein the encoding further comprises:

encoding the boundary block according to the final MCP block.

10. The method of claim 9, wherein the encoding the boundary block further comprises:

determining an offset based on a difference between an average pixel value of the boundary block and an average pixel value of the final reference boundary block of the boundary block that is in the reference picture; and applying the offset to at least a sample in the final MCP block.

11. The method of claim 9, wherein the method includes generating an offset; and the method further comprises:

applying the offset to at least a sample in the final MCP block.

12. The method of claim 9, further comprising:

filtering the sample in the final MCP block based on at least one sample within the picture that is within N1 lines of the picture boundary of the picture.

13. A method of processing visual media data, the method comprising:

processing a bitstream that includes the visual media data according to a format rule, wherein the bitstream includes a plurality of pictures; and the format rule specifies that:

an initial motion vector (MV) associated with an initial motion compensation padding (MCP) block of a boundary block of a picture in the plurality of pictures, the initial MV is from the boundary block to an initial reference boundary block, the initial MV is determined having a fractional precision, the initial MV is determined according to motion information of the boundary block located at a picture boundary of the picture in the plurality of pictures, the boundary block is located in the picture, the initial MCP block is located in an MCP area outside of the picture and adjacent to the picture boundary of the picture, a final MV having an integer precision from the boundary block to a final reference boundary block based on an X component and a Y component of the initial MV associated with the initial MCP block, an X component of the final MV being equal to the X component of the initial MV rounded to a first integer when the X component of the initial MV is fractional, and a Y component of the final MV being equal to the Y component of the initial MV rounded to a second integer when the Y component of the initial MV is fractional, the final MV is associated with a final MCP block, and at least a sample in the boundary block is processed according to the final MV having the integer precision.

14. The method of claim 13, wherein when the X or Y component is a positive value, the final MV is generated by rounding the X or Y component towards positive infinity; and when the X or Y component is a negative value, the final MV is generated by rounding the component towards negative infinity.

15. The method of claim 13, wherein the format rule further specifies:

the boundary block is processed according to the final MCP block.

16. The method of claim 15, the format rule further specifies:

an offset is determined based on a difference between an average pixel value of the boundary block and an average pixel value of the final reference boundary block of the boundary block that is in the reference picture; and the offset is applied to at least the sample in the final MCP block.

17. The method of claim 15, wherein the format rule further specifies:

an offset is applied to at least a sample in the final MCP block.

18. The method of claim 15, wherein the format rule further specifies:

the sample in the final MCP block is filtered based on at least one sample within the picture that is within N1 lines of the picture boundary of the picture.

* * * * *